(12) United States Patent
Sharma et al.

(10) Patent No.: US 12,212,499 B2
(45) Date of Patent: Jan. 28, 2025

(54) MANAGEMENT OF TRAFFIC OVER A COMMUNICATION CHANNEL

(71) Applicant: Telefonaktiebolaget LM Ericsson (publ), Stockholm (SE)

(72) Inventors: Nipun Sharma, New Delhi (IN); Rakesh Bajpai, New Delhi (IN); Hans Eriksson, Sollentuna (SE); Tushar Sabharwal, New Delhi (IN); Rajiv Bhardwaj, Jalandhar (IN); Michael Grimes, Athlone (IE); James O'Meara, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/766,193

(22) PCT Filed: Oct. 3, 2019

(86) PCT No.: PCT/EP2019/076851
§ 371 (c)(1),
(2) Date: Apr. 1, 2022

(87) PCT Pub. No.: WO2021/063515
PCT Pub. Date: Apr. 8, 2021

(65) Prior Publication Data
US 2024/0064105 A1    Feb. 22, 2024

(51) Int. Cl.
*H04L 41/16* (2022.01)
*H04L 47/127* (2022.01)
*H04L 47/2416* (2022.01)

(52) U.S. Cl.
CPC .......... *H04L 47/2416* (2013.01); *H04L 41/16* (2013.01); *H04L 47/127* (2013.01)

(58) Field of Classification Search
CPC .... H04L 47/2416; H04L 41/16; H04L 47/127
See application file for complete search history.

(56) References Cited

U.S. PATENT DOCUMENTS 11,855,864 B2 * 12/2023 Han ..................... H04L 43/062
2006/0013136 A1 * 1/2006 Goldschmidt .......... H04L 47/10
370/235

(Continued)

OTHER PUBLICATIONS

International Search Report and Written Opinion of the International Searching Authority for PCT International Application No. PCT/EP2019/076851 dated May 14, 2020.
Huawei et al., "Update to Use Case NWDA-Assisted Traffic Handling," S2-181966, SA WG2 Meeting #125, Feb. 26-Mar. 2, 2018, Montreal, Canada, 2 pages.

(Continued)

*Primary Examiner* — Aftab N. Khan
(74) *Attorney, Agent, or Firm* — Sage Patent Group

(57) ABSTRACT

A method for managing traffic processed by a target network function of a communication network is disclosed. The target network function transmits and receives traffic over a communication channel that carries traffic between network functions and application functions. The method, performed by a Data Analytics Function (DAF) of a communication network, comprises receiving information about traffic flows over the communication channel, establishing a priority amongst traffic flows over the communication channel, based on the received information, generating a recommendation for traffic processing on the basis of the established priority, and sending the generated recommendation to a function in the network that has a management responsibility for the target network function.

15 Claims, 21 Drawing Sheets

(56) References Cited

U.S. PATENT DOCUMENTS

| | | | | |
|---|---|---|---|---|
| 2014/0153406 | A1* | 6/2014 | Brolin | H04L 43/50 |
| | | | | 370/241.1 |
| 2017/0317894 | A1* | 11/2017 | Dao | H04L 41/5009 |
| 2017/0332282 | A1* | 11/2017 | Dao | H04L 1/0002 |
| 2018/0262924 | A1 | 9/2018 | Dao et al. | |
| 2019/0053308 | A1* | 2/2019 | Castellanos Zamora | |
| | | | | H04L 65/1016 |
| 2019/0069199 | A1* | 2/2019 | Yan | H04W 28/0268 |
| 2019/0215272 | A1* | 7/2019 | Singh | H04L 47/2475 |
| 2019/0222489 | A1* | 7/2019 | Shan | H04M 15/8022 |
| 2021/0022022 | A1* | 1/2021 | Guo | H04L 41/14 |
| 2021/0282038 | A1* | 9/2021 | Li | H04W 24/08 |
| 2022/0329529 | A1* | 10/2022 | Maria | H04L 41/0895 |
| 2022/0377645 | A1* | 11/2022 | Muñoz De La Torre Alonso | |
| | | | | H04L 41/0895 |
| 2023/0188448 | A1* | 6/2023 | Kodaypak | H04W 48/18 |
| | | | | 709/224 |

OTHER PUBLICATIONS

3GPP TR 23.791 V0.4.0, "3rd Generation Partnership Project; Technical Specification Group Services and System Aspects; Study of Enablers for Network Automation for 5G (Release 16)," Jun. 2018, 31 pages.

3GPP TS 23.288 V0.4.0, "3rd Generation Partnership Project; Technical Specification Group Services and System Aspects; Architecture enhancements for 5G System (5GS) to support network data analytics services (Release 16)," Apr. 2019, 48 pages.

3GPP TR 29.843 V1.1.0, "3rd Generation Partnership Project; Technical Specification Group Core Network and Terminals; Study on Load and Overload Control of 5GC Service Based Interfaces; (Release 16)," Apr. 2019, 32 pages.

Communication pursuant to Article 94(3) EPC for European Patent Application No. 19790149.9 dated Jan. 19, 2024, 6 pages.

ETRI, "TR 23.791: Update of Solution 1 and 9 for Priority based NWDAF Service subscription/request," S2-1812157, SA WG2 Meeting #129-BIS, Nov. 26-30, 2018, West Palm Beach, USA, 5 pages.

* cited by examiner

MANAGEMENT OF TRAFFIC OVER A COMMUNICATION CHANNEL

CROSS REFERENCE TO RELATED APPLICATION

This application is a 35 U.S.C. § 371 national stage application of PCT International Application No. PCT/EP2019/076851 filed on Oct. 3, 2019, the disclosure and content of which is incorporated by reference herein in its entirety.

TECHNICAL FIELD

The present disclosure relates to methods for managing traffic processed by a target network function of a communication network, wherein the target network function transmits and receives traffic over a communication channel that carries traffic between network functions and application functions. The methods may be carried out by a Data Analytics Function, the target Network Function, a Load Balancer and a Support System. The present disclosure also relates to a computer program product and to Functions, a Load Balancer and System operable to carry out the methods.

BACKGROUND

In the 5G Service Based Architecture, the Network Exposure Function (NEF) is introduced or enhanced from the SCEF present in the 4G architecture. The NEF exists to interact with the enterprise world to enable new business use cases envisaged for 5G. Architecture relating to the NEF is illustrated in FIG. 1, which is extracted from 3GPP TS 23.501 v.16.2.0.

As set out in 3GPP TS 23.501 v.16.2.0, the NEF supports the following independent functionality:
Exposure of Capabilities and Events:
  3GPP Network Functions (NFs) expose capabilities and events to other NFs via NEF. NF exposed capabilities and events may be securely exposed for the use of Application Functions and Edge Computing, which may be not be owned by an operator of the 3GPP network, as described in clause 5.13 of the TS. The NEF stores and retrieves information as structured data using a standardized interface (Nudr) to the Unified Data Repository (UDR). The NEF can access the UDR located in the same PLMN as the NEF.
Secure Provision of Information from External Application to 3GPP Network:
  The NEF provides a means for the Application Functions to securely provide information to 3GPP network, including for example Expected UE Behaviour. In such cases the NEF may authenticate and authorize, and assist in throttling, the Application Functions.
Translation of Internal-External Information:
  The NEF translates between information exchanged with the AF(s) and information exchanged with the internal network function(s) of the 3GPP network. For example, the NEF translates between an AF-Service-Identifier and internal 5G Core information such as DNN, S-NSSAI, as described in clause 5.6.7 of the TS. In particular, the NEF handles masking of network and user sensitive information to external AFs according to network policy.
  The NEF receives information from other NFs (based on exposed capabilities of other NFs). The NEF stores the received information as structured data using a standardized interface to a Unified Data Repository (UDR) (interface to be defined by 3GPP). The stored information can be accessed and "re-exposed" by the NEF to other network functions and Application Functions, and used for other purposes such as analytics.

A NEF may also support a PFD Function. The PFD Function in the NEF may store and retrieve PFD(s) in the UDR and provide PFD(s) to the Session Management Function (SMF) on the request of SMF (pull mode) or on the request of PFD management from the NEF (push mode), as described in 3GPP TS 23.503 v.16.2.0.

A specific NEF instance may support one or more of the functionalities described above, and consequently an individual NEF may support a subset of the APIs specified for capability exposure Multiple functionality is thus expected of the NEF, and for all practical purposes it can be assumed that NEF congestion is a reality of telecommunication in a 5G 3GPP network. This is particularly so when Application Functions with which the NEF would be interacting are part of a domain that is external to the network operator.

Devices with which a NEF communicates may generate short messages that could be sent frequently or very rarely according to 5G service exposure capabilities. Such traffic characteristics generate a dynamic traffic pattern that has a very high variance in load and intensity. As the NEF is located centrally in the network, a large portion of this "spiky-traffic" is aggregated when reaching the NEF, and as aggregated traffic demonstrates somewhat smoother traffic characteristics. Typically, in dimensioning of user-plane traffic, overprovisioning is performed by a factor of 2 to allow for high traffic spikes. According to current proposals, a mix of control plane and user plane traffic is seen from the application perspective, and is carried in the control plane of the telecommunication network (i.e. Non IP data delivery (NIDD), DoNAS, AMF to NEF without passing a UPF). In this proposal it could be expected that traffic variations over time may be very large and prediction metrics are required to determine risk for resource congestion.

The following example NEF related use cases illustrate situations in which traffic increase in the network could be outside the network operator's domain or control.
  a) The NEF can be congested because of NIDD (Non IP data delivery) in which user plane data will flow over control plane via the NEF for millions of devices i.e. UE→gNB→AMF→NEF→trusted/untrusted AFs. If for some reason millions of IoT devices are powered off or perform firmware upgrade at the same time and/or plan to communicate at the same time, congestion in the NEF will result.
  b) The NEF will also be used for control plane message for Massive IoT use-cases including:
    a. AF requesting for change in policy/bandwidth i.e. AF→NEF→PCF
    b. Device Trigger Delivery
    c. Sponsored Data
    d. UE Reachability and Monitoring
    e. Inform $3^{rd}$ Party of Network Issues
    f. UE Footprint
    g. Set QoS for UE Session
    h. $3^{rd}$ Party Interaction for UE Patterns
    i. Group Message Delivery
    j. Background Data Transfer
    k. Packet Flow Descriptor (PFD) Management
    l. MSISDN-less MO-SMS
    m. Enhanced Coverage Restriction Control
    n. Network Configuration Parameters c) The 3GPP TR 23.731 v.16.0.0 specification (Study on Enhancement to the 5GC Location services) highlights use-cases where Control plane congestion happened and therefore proposes, if possible, the provision of location services via user plane (section 5.2, of 3GPP TS 23.791 v.16.2.0) as well as suggesting other alternatives.

d) The 3GPP 23.791 v.16.2.0 specification (Study on enablers for network automation), highlights many use cases in which 5G network/MDAF/NWDAF and Application Functions will be exchanging information, analytics and/or co-ordinates for enhanced use cases. In one of the use-cases, (Usecase 1: how to get information from AF), a probability of NEF overload is highlighted.

Management of NEF congestion is therefore an ongoing challenge for 3GPP networks and is representative of the challenge facing any network function transmitting and receiving traffic over a communication channel that is operable to carry traffic, which may comprise control plane messages and/or user plane data, between Network Functions and Application Functions.

SUMMARY

It is an aim of the present disclosure to provide method, functions and a computer readable medium which at least partially address one or more of the challenges discussed above.

According to a first aspect of the present disclosure, there is provided a method for managing traffic processed by a target network function of a communication network, wherein the target network function transmits and receives traffic over a communication channel that carries traffic between network functions and application functions. The method, performed by a Data Analytics Function (DAF) of a communication network, comprises receiving information about traffic flows over the communication channel, establishing a priority amongst traffic flows over the communication channel, based on the received information and generating a recommendation for traffic processing on the basis of the established priority. The method further comprises sending the generated recommendation to a function in the network that has a management responsibility for the target network function.

According to another aspect of the present disclosure, there is provided another method for managing traffic processed by a target Network Function (NF) of a communication network, wherein the target NF transmits and receives traffic over a communication channel that carries traffic between network functions and application functions. The method, performed by the target NF, comprises receiving a recommendation from another function in the network and processing traffic received at the network function over the communication channel in accordance with the received recommendation. The recommendation determines a priority with which different traffic flows are to be processed in the network function.

According to another aspect of the present disclosure, there is provided another method for managing traffic processed by a target network function of a communication network, wherein the target network function transmits and receives traffic over a communication channel that carries traffic between network functions and application functions. The method, performed by a Load Balancer (LB) in a communication network, comprises receiving a recommendation from another function in the network, and distributing traffic received at the LB between instances of the target network function in accordance with the received recommendation. The recommendation determines a priority with which different traffic flows are to be processed by instances of the target network function.

According to another aspect of the present disclosure, there is provided another method for managing traffic processed by a target network function of a communication network, wherein the target network function transmits and receives traffic over a communication channel that carries traffic between network functions and application functions. The method, performed by a Support System in a communication network, comprises receiving a recommendation from a Data Analytics Function in the network, and sending a policy control rule based on the received recommendation to at least one of the target function in the network and/or a Load Balancer, LB, in the network. The recommendation determines a priority with which different traffic flows are to be processed by instances of the target network function.

According to another aspect of the present disclosure, there is provided a Data Analytics Function, DAF, for a communication network. The DAF is for managing traffic processed by a target network function of a communication network, wherein the target network function transmits and receives traffic over a communication channel that carries traffic between network functions and application functions. The DAF comprises processing circuitry and a memory. The memory contains instructions executable by the processing circuitry such that the DAF is operative to receive information about traffic flows over the communication channel and to establish a priority amongst traffic flows over the communication channel, based on the received information. The DAF is also operative to generate a recommendation for traffic processing on the basis of the established priority and to send the generated recommendation to a function in the network that has a management responsibility for the target network function.

According to another aspect of the present disclosure, there is provided a Data Analytics Function, DAF, for a communication network. The DAF is for managing traffic processed by a target network function of a communication network, wherein the target network function transmits and receives traffic over a communication channel that carries traffic between network functions and application functions. The DAF is adapted to receive information about traffic flows over the communication channel and to establish a priority amongst traffic flows over the communication channel, based on the received information. The DAF is also adapted to generate a recommendation for traffic processing on the basis of the established priority and to send the generated recommendation to a function in the network that has a management responsibility for the target network function.

According to another aspect of the present disclosure, there is provided a target Network Function, NF, for a communications network. The target NF is for managing traffic processed by the target NF, wherein the target NF transmits and receives traffic over a communication channel that carries traffic between network functions and application functions. The target NF comprises processing circuitry and a memory. The memory contains instructions executable by the processing circuitry such that the NF is operative to receive a recommendation from another function in the network and process traffic received at the network function over the communication channel in accordance with the received recommendation. The recommendation determines a priority with which different traffic flows are to be processed in the network function.

According to another aspect of the present disclosure, there is provided a target Network Function, NF, for a communications network. The target NF is for managing traffic processed by the target NF, wherein the target NF transmits and receives traffic over a communication channel that carries traffic between network functions and application functions. The target NF is adapted to receive a recommendation from another function in the network; and process traffic received at the network function over the communication channel in accordance with the received recommendation. The recommendation determines a priority with which different traffic flows are to be processed in the network function.

According to another aspect of the present disclosure, there is provided a Load Balancer, LB, for a communication network. The LB is for managing traffic processed by a target network function of a communication network, wherein the target network function transmits and receives traffic over a communication channel that carries traffic between network functions and application functions. The LB comprises processing circuitry and a memory. The memory contains instructions executable by the processing circuitry such that the LB is operative to receive a recommendation from another function in the network and to distribute traffic received at the LB between instances of the target network function in accordance with the received recommendation. The recommendation determines a priority with which different traffic flows are to be processed by instances of the target network function.

According to another aspect of the present disclosure, there is provided a Load Balancer, LB, for a communication network. The LB is for managing traffic processed by a target network function of a communication network, wherein the target network function transmits and receives traffic over a communication channel that carries traffic between network functions and application functions. The LB is adapted to receive a recommendation from another function in the network and to distribute traffic received at the LB between instances of the target network function in accordance with the received recommendation. The recommendation determines a priority with which different traffic flows are to be processed by instances of the target network function.

According to another aspect of the present disclosure, there is provided a Support System for a communication network. The Support System is for managing traffic processed by a target network function of a communication network, wherein the target network function transmits and receives traffic over a communication channel that carries traffic between network functions and application functions. The Support System comprises processing circuitry and a memory. The memory contains instructions executable by the processing circuitry such that the Support System is operative to receive a recommendation from a Data Analytics Function in the network and send a policy control rule based on the received recommendation to at least one of: the target function in the network and a Load Balancer, LB, in the network. The recommendation determines a priority with which different traffic flows are to be processed by instances of the target network function.

According to another aspect of the present disclosure, there is provided a Support System for a communication network. The Support System is for managing traffic processed by a target network function of a communication network, wherein the target network function transmits and receives traffic over a communication channel that carries traffic between network functions and application functions. The Support System is adapted to receive a recommendation from a Data Analytics Function in the network and to send a policy control rule based on the received recommendation to at least one of: the target function in the network and a Load Balancer, LB, in the network. The recommendation determines a priority with which different traffic flows are to be processed by instances of the target network function.

According to further aspects of the present disclosure, there is provided a computer program, carrier, and computer program product configured to cause a processor to carry out methods according to the present disclosure.

Aspects and examples of the present disclosure enable the prioritisation of traffic over a communication channel that carries traffic between network functions and application functions, so facilitating the management of congestion situations. Such methods may therefore assist in the reduction of capital and operational expenditure while maximising network performance and revenue generation.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
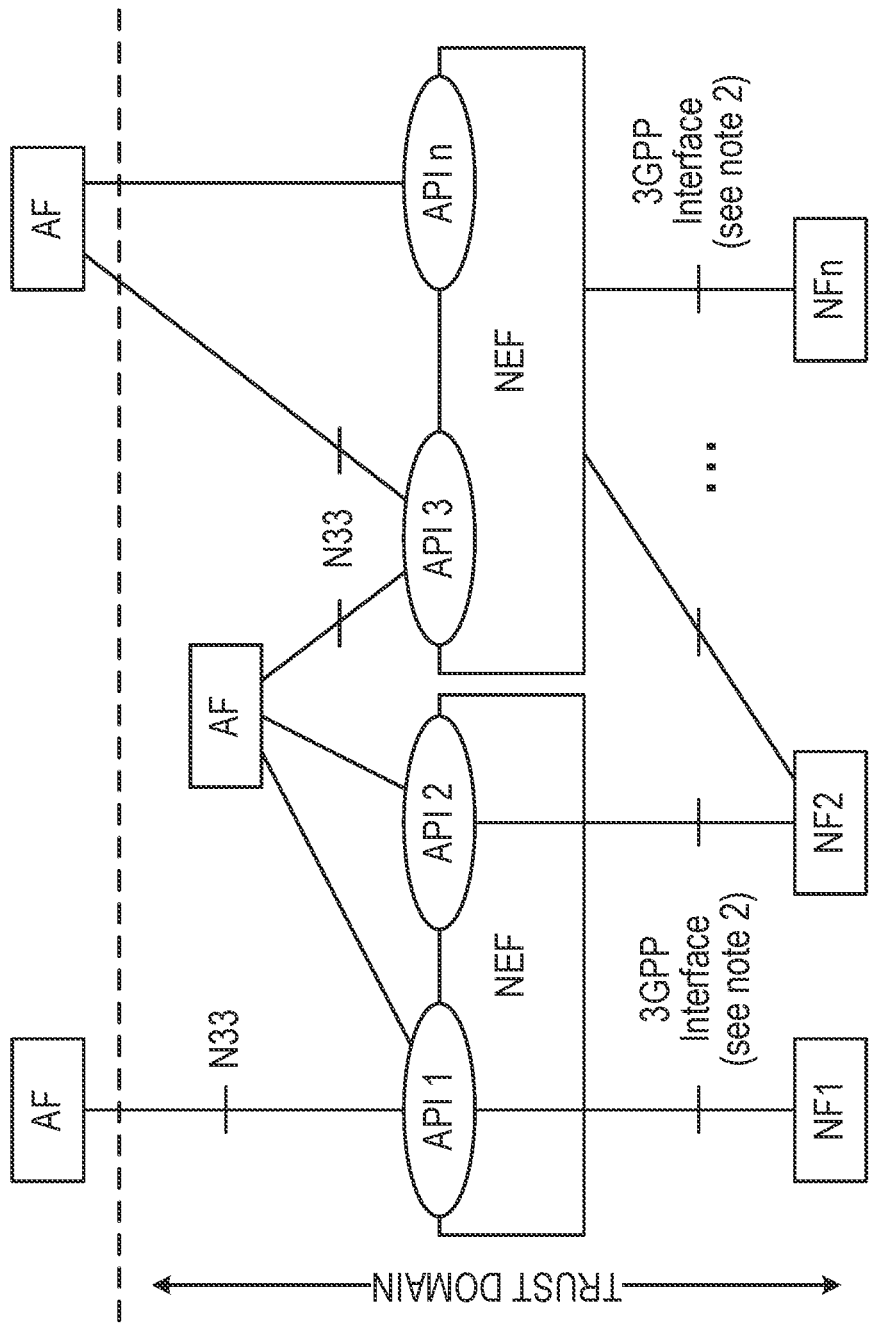
FIG. 1 illustrates an example network architecture.

Examples of the present disclosure provide methods enabling the prioritization of traffic over a communication channel between Network Functions and Application Functions. This prioritization may be based on different factors including revenue insights, service assurance insights, etc. and may be applied during periods in which there is a high probability of resource congestion in a target Network Function (NF). Although the methods and Functions described herein are applicable to any target network function transmitting and receiving traffic over a communication channel as described above, much of the following discussion introduces examples and implementations of methods in the context of managing congestion within a target NF in the form of a NEF, either through policies applied within the NEF or at a Load Balancer.

An instance of a NEF can be positioned at Network Slice level or at PLMN level. At any given time, a NEF will often be supporting multiple Application Functions whether as part of a specific Network slice or within a PLMN such as for example:
  a) LADN/EDGE AFs as well as centralized AFs (different instances of the same AF),
  b) eMBB network slice supporting 100+ AFs (Amazon prime, Airtel Wynk, Netflix, etc.)
  c) Massive IoT network slice supporting multiple vendors including Smart meters, tracking, logistics, etc. and hence supporting 100+ AF.

Example methods according to the present disclosure offer the possibility of prioritizing traffic according to a wide range of factors, some of which are highlighted below:
  a) Prioritization of traffic corresponding to one particular AF or subscriber over traffic corresponding to other AFs or subscribers. The prioritized AFs or subscribers may represent higher revenue streams or may be benefit from a static prioritization on the basis of negotiated contracts. This use case refers to user plane information delivered over UPF/PGW (and not NIDD) and a load balancer, if present, may prioritize the information among respective UPF nodes.
  b) Prioritization of traffic based on average session time/ event time, spike, etc. For example, if smart meter traffic has a spike of 10% at 00:00 each day, this may be prioritized, as the spike is short-lived and the probability is that overall NEF traffic from other AFs is reduced at this time when compared with average daytime/evening conditions.
  c) Prioritization based on Network Slice. In this case for example, an AF for eMBB NS request may be prioritized over an AF request for Massive IoT (non-critical) NS.
  d) Prioritization of traffic from LADN AFs as opposed to non-LADN AFs. This information is provided by the AF themselves (LADN AFs require low latency). The NEF and/or Load Balancer(s) should ensure that session based communication (as compared to event based communication) is managed by same AF (either centralized or LADN AF for initiated sessions).
  e) A NFVO can expand a NEF and other nodes. This may for example be based upon a range of information available at NEF DB or NWDAF/MDAF including historical data on traffic spike duration from respective AF at particular time, day, date etc. In one illustrative example, for a traffic spike of 2 minutes from AFx, the NFVO does not need it to be addressed (this situation could be covered by one or more of the above use cases). However, if a traffic spike from AFy is expected to last for a period of several days, the NFVO could be addressed and would be configured with an appropriate NS level blue print for increasing provision. For example, for massive IoT expansion (NIDD use case) only the NEF and AMF would need to be expanded to manage the spike, as the assumption would be that the gNB might not be overloaded and other P-GW/UPF nodes do not feature from a load perspective. In a further example, the orchestration part/EO/NFVO may also be expanded.

Implementation of the methods disclosed herein may involve enhancing the knowledge set available to appropriate functions in order to provide real time feedback to NEF in a dynamic manner for traffic prioritization and/or introducing one or more load balancers which may provide prioritization policy dynamically among different Network Functions including NEFs.

Example methods according to the present disclosure are now presented with reference to the flow charts illustrated in FIGS. 2 to 8. The methods are conducted at different network functions which may cooperate to provide the aspects of the above discussed functionality. Following the introduction of the methods, there is then provided a discussion of how such methods may be implemented through example signaling flow and use cases.

Figure 2:
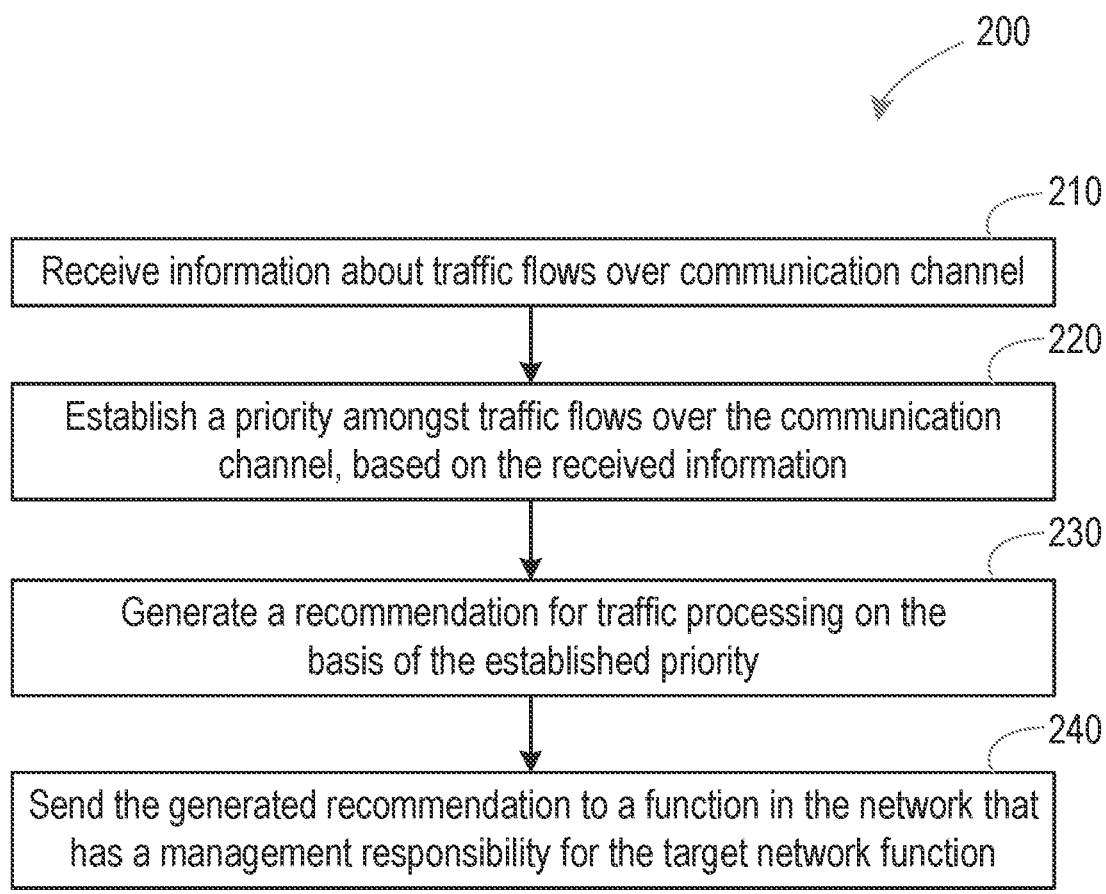
FIGS. 2 to 8 are flow charts illustrating process steps in example methods for managing traffic processed by a target network function of a communication network.

FIG. 2 is a flow chart illustrating process steps in a method 200 for managing traffic processed by a target network function of a communication network, wherein the target network function transmits and receives traffic over a communication channel that carries traffic between network functions and application functions. The communication channel may comprise a control plane communication channel that carries control plane messages between network functions and/or user plane data packets related to end user applications.

The method 200 is performed by a Data Analytics Function (DAF) of a communication network, which may comprise a Network DAF (NWDAF) or a Management DAF (MDAF). Referring to FIG. 2, the method comprises, in a first step 210, receiving information about traffic flows over the communication channel. In step 220, the method comprises establishing a priority amongst traffic flows over the communication channel, based on the received information. The method then comprises, in step 230, generating a recommendation for traffic processing on the basis of the established priority, and, in step 240, sending the generated recommendation to a function in the network that has a management responsibility for the target network function.

The "function in the network that has a management responsibility for the target network function" may be the target network function itself. Thus, the recommendation (which may be the policy control rule as discussed in further detail below) may be transmitted directly to the target network function in which the recommendation will be implemented. In other examples, the function with management responsibility may be a separate function, such as an OSS/BSS or load balancer with responsibility for the target network function. Examples of target network function include the NEF, AMF, SMF and PCF, as all these functions transmit and receive data over a communication channel that carries traffic between network functions and application functions. In the case of AMF, SMF and PCF, the AF communicates with the NEF that is part of this communication channel. In case of AF to PCF, the communication channel also includes a Data Base (UDR). For example, when an AF sends data to a PCF, the AF contacts a NEF that stores data in a UDR and a service notification is sent to the PCF from the UDR. Thus a communication channel exists between the AF/NEF and the PCF.

As mentioned briefly above, the recommendation generated by the DAF may comprise a policy control rule, or may take a range of other forms. The recommendation comprises an output of the DAF, which may be generated by an Artificial Intelligence or Machine Learning algorithm running on the DAF, as will be discussed in further detail below. The nature of the recommendation may vary according to the nature of the function with management responsibility to which the recommendation is to be sent. Different examples of recommendation may thus be envisaged as follows:

a) DAF internal results (DAF to DAF) based on input including:
1) different input counters describing load situation,
2) information on whether or not network slice service agreements are fulfilled (see also "c" below), and
3) revenue information covering both subscriber revenues and network slices (NS) revenues: a NS is defined by a business purpose and a network service description that can be related to a revenue that the NS generates for example for an enterprise customer that uses the NS.

Output from the DAF (insight about a condition including a recommendation of an action) may include:

DAF makes a prediction on what will happen with revenue if priority level is changed in the NEF or the LB, and DAF tries to find an optimal priority setting based on historical data and current network conditions. This priority information is then sent as output from the DAF directly to the target NF or LB. In another example, (DAF to OSS) the DAF sends predicted priority level through an OSS, so allowing a network operator to acknowledge the change before it is implemented. The network operator may thus decide whether or not to allow closed loop regulations of priority levels, and whether or not manual interactions are required for selected cases or for all cases (for example for selected NFs or subscribers). It will be appreciated that the DAF may run any number of iterative analyses using DAF output results (also referred to as insights) until a final result is delivered to a NF as in "b", "c" and "d" below.

b) DAF results sent direct to Network Function (NF) or sent direct to a Load balancer function LB as described in "a)" above in the output from the DAF. DAF output recommendation may in this case comprise a policy control rule on priority level when scheduling traffic that corresponds to a particular subscriber or AF.

c) DAF results sent to OSS. Different scenarios may be envisaged as follows:
1) Recommended priority level for traffic flows for subscriber(s) and/or AF(s) as described in "a)" above with reference to example "DAF to OSS".
2) Recommended priority level to mitigate risk of performance degradation. The DAF may determine that a network service, for example a Network Slice (NS), it at increased risk of failing to meet targets for Key Performance Indicators (KPIs). It will be appreciated that NS performance is described by KPIs that refer to a Service Level Agreement (SLA). The SLA describes agreed limits for measurable performance parameters relating a network slice. Such parameters may include total aggregated max bit rate, average bit rate measured under a defined time period, packet loss rate under a defined time period, etc. If performance is predicted to be degraded for a NS below a threshold value, the DAF may deliver a recommended priority level for traffic belonging to the NS that may be used to mitigate the risk of performance degradation below the threshold. The recommendation may also consider relation to other NSs that use the same NF (for example the same NEF). As discussed above, there may be a single NEF instance for an entire PLMN, for a group of NSs or for a single NS.

d) DAF results sent to BSS. The output from the DAF may in some examples include a predicted revenue value for subscribers and network slices (in the case network slices is used in a business agreement). This predicted revenue information may be used in a BSS to propose a new priority level for subscribers or network slices to meet business strategies. According to operator business preferences, the new priority level may be sent automatically to an OSS. The OSS then decides whether or not an update shall be done, for example on the basis of other information available to the OSS and network operations strategies that are to be considered before any automatic updates is done of the priorities of NEF or LB.

Figure 3A:
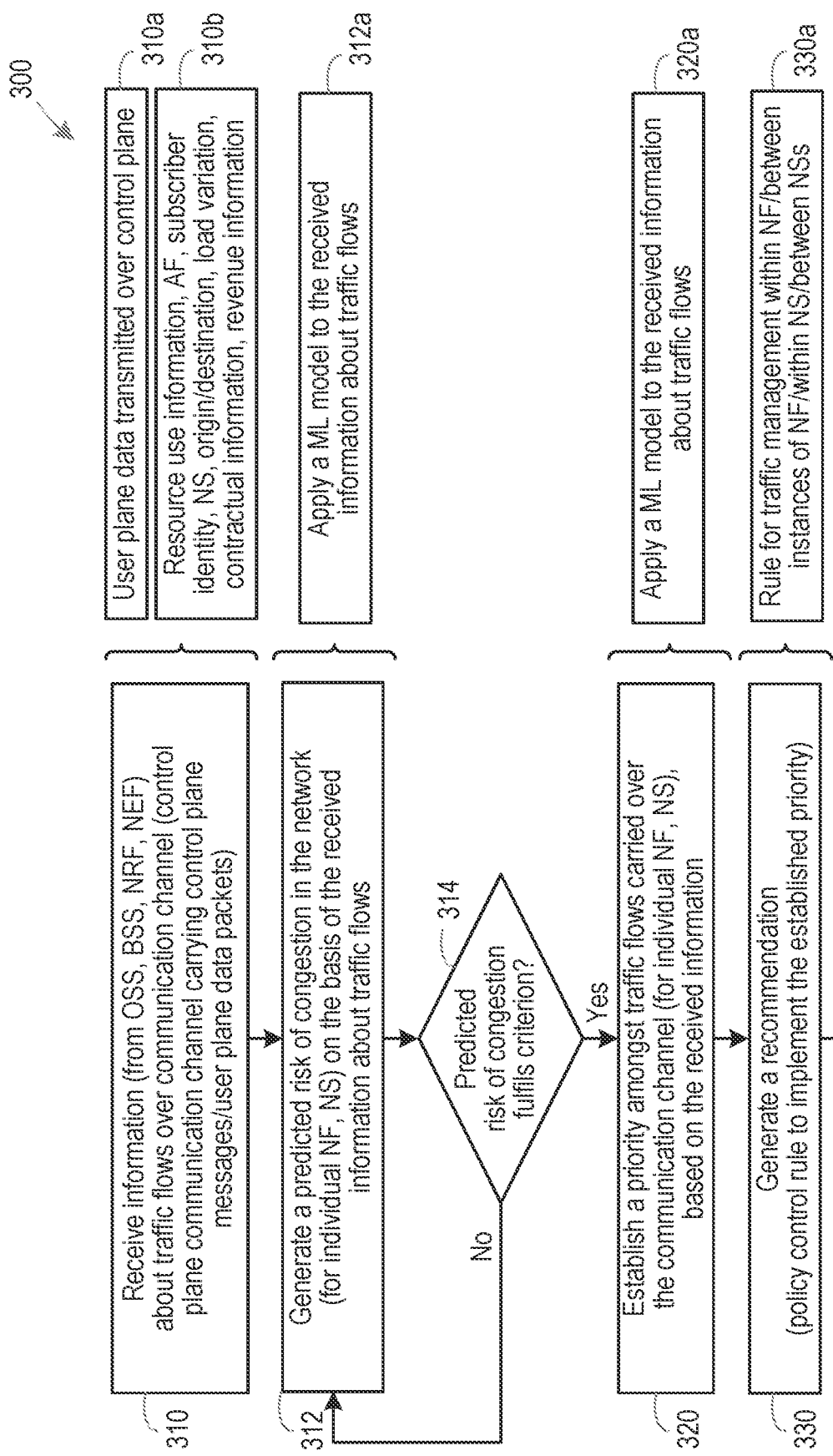
Figure 3B:
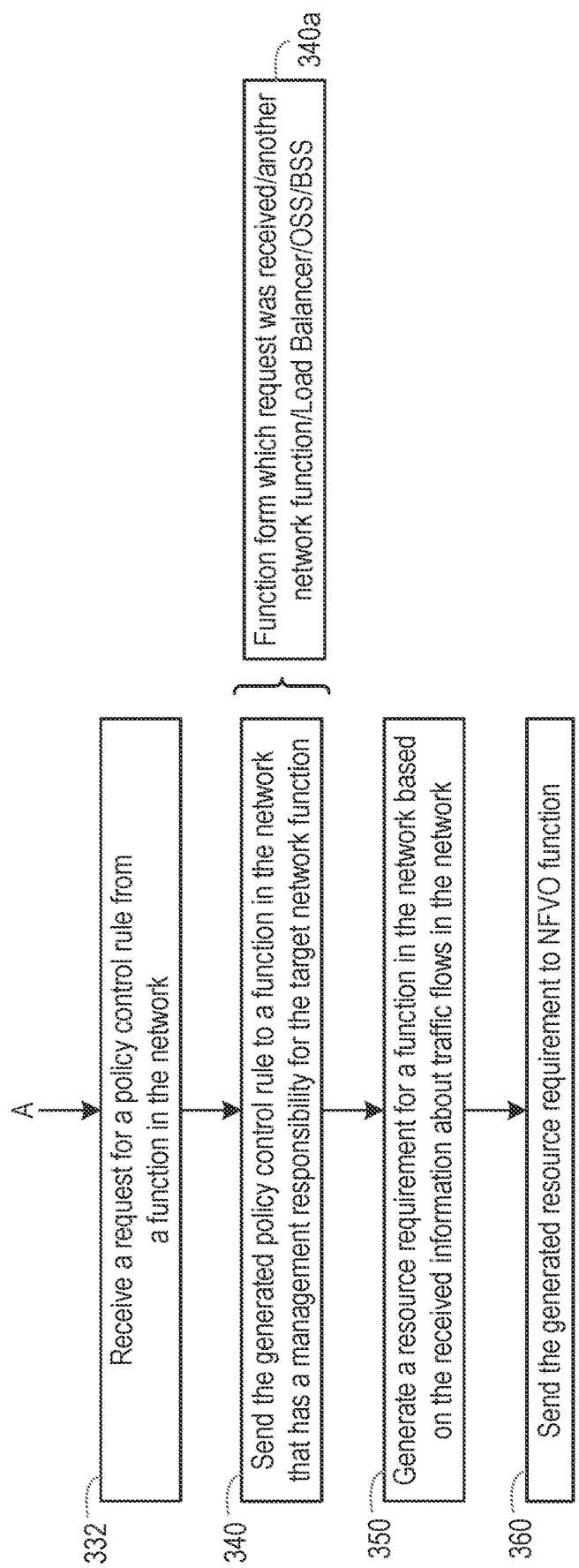

FIGS. 3a and 3b show a flow chart illustrating process steps in another example of method 300 for managing traffic processed by a target network function of a communication network, wherein the target network function transmits and receives traffic over a communication channel that carries traffic between network functions and application functions. The steps of the method 300 illustrate one way in which the steps of the method 200 may be implemented and supplemented to achieve the above discussed and additional functionality. As for the method 200, the communication channel may comprise a control plane communication channel that carries control plane messages between network functions and/or user plane data packets related to end user applications.

The method 300 is performed by a Data Analytics Function (DAF) of a communication network, which may comprise a Network DAF (NWDAF) or a Management DAF (MDAF). Referring to FIG. 3a, in step 310, the DAF receives information about traffic flows over the communication channel. As illustrated at 310a, the received information may be information about traffic flows comprising user plane data that is transmitted over the control plane. As illustrated at 310b, the information about traffic flows carried over the communication channel may comprises at least one of resource use information associated with the traffic flows, an Application Function (AF) associated with the traffic flows, a subscriber identity associated with the traffic flows, a Network Slice (NS) associated with the traffic flows, an origin or destination for the traffic flows and/or variation in traffic load of the traffic flows over time. Resource use information associated with the traffic flows may comprise resource use information for the resources used by the traffic flows (radio resources etc.), resource use information for resources used by an AF or NS associated with the traffic flows. In the case of a NS, the resources used may be for one traffic flow for an AF or for total traffic for an AF.

The information about traffic flows carried over the communication channel may further comprise at least one of contractual information for an AF, subscriber identity or NS associated with the traffic flows and/or revenue information for an AF, subscriber identity or NS associated with the traffic flows. The contractual information may for example comprise static prioritisation established under a contract or other contractual information such as Service Level Agreements (SLAs), etc. The information may also include NF service assurance information such as KPI indicators for statistics with regards to NS total resource capacity, discarded packets and delay measures etc.

As illustrated in step 310, the information may be received from any one or more of an Operations Support System (OSS), a Business Support System (BSS), a Network Resource Function (NRF), and/or a Network Exposure Function, NEF. In some examples, the information about traffic flows may therefore be received from, inter alia, the target network function itself, if the target NF is a NEF. For example, the NEF may forward information relating to individual AFs, which information is provided to the NEF by the AFs. Such information may include status information for the AF, such as CPU, memory or other resource status information for the AF. This information may be provided by the NEF to the DAF and be used by the DAF to establish the priority and recommendation which will be used to manage traffic in the NEF.

In step 312, the DAF generates a predicted risk of congestion in the network on the basis of the received information about traffic flows carried over the communication channel. Generating a predicted risk of congestion in the network may also be based on other traffic load information for the network. The risk of congestion in the network may be a risk of congestion in at least one of the target network function and or a NS of the network in which the target network function is configured to transmit and receive traffic. The risk of congestion may be used to generate an assessment of a risk that an SLA is not fulfilled for an application service related to a subscriber or for a network slice service provided to customer. It will be appreciated while increased risk of congestion increases the risk that an SLA will not be fulfilled, it is also possible that even at times of congestion, an SLA may be fulfilled if all thresholds for performance parameters are met.

As illustrated at step 312a, generating a predicted risk of congestion in the network may comprise applying a Machine Learning (ML) model to the received information about traffic flows over the communication channel, and other traffic flow information in the network, according to different examples. The ML model used may be the same model as is used to establish a priority amongst traffic flows later in the method 300. In some examples, the performance of subsequent method steps in the method 300 may be dependent upon the predicted risk of congestion in the network fulfilling a criterion (for example being over a threshold value) in step 314. If the predicted risk of congestion is low, then current priority levels for traffic flows and current policies for traffic processing may be working acceptably. The criterion at step 314 may specify a particular traffic profile, for example corresponding to a traffic spike of a particular severity and/or duration. For example, characteristics for assessment may include variance between maximum and minimum traffic load during an assessment time period, frequency of maximum and minimum loads within the assessment time period, time duration over a percentage of the maximum traffic load, etc.

In step 320, the DAF establishes a priority amongst traffic flows carried over the communication channel, based on the received information. This may be a priority amongst traffic flows carried over the communication channel for the target network function or for a NS in which the target network function is configured to transmit and receive traffic. As illustrated at step 320a, this may comprise applying a Machine Learning (ML) model to the received information, the ML model trained to prioritise traffic flows according to a defined objective. The objective may be defined by a network operator and may for example comprise maximising revenue generated by traffic flows carried over the communication channel while respecting contractual obligations associated with the traffic flows.

In step 330, the DAF generates a recommendation for traffic processing based on the established priority. The nature of the recommendation may vary according to particular implementations of the method, and according to the nature of the function to which the recommendation is to be sent, as discussed in greater detail above with reference to FIG. 2. In some examples, the recommendation may comprise a policy control rule to implement the established priority. As illustrated at 330a, such a policy control rule may comprise at least one of a rule for traffic management within the target network function, a rule for traffic management between instances of the target network function, a rule for traffic management within the NS in which the target network function is configured to transmit and receive traffic, and/or a rule for traffic management between NSs.

Referring now to FIG. 3b, at step 332, the DAF receives a request for a policy control rule from a function in the network that has a management responsibility for the target network function. In step 340, the DAF sends the generated recommendation (which may for example comprise a policy control rule) to a function in the network that has a management responsibility for the target network function. Such a management function may comprise, as illustrated at 340a, the target network function itself, another function in the network with a management responsibility for the target network function, a function in the network with responsibility for a NS in which the target network function is configured to transmit and receive traffic, a load balancer, an OSS and/or a BSS. The management function may be the function from which a request for a policy control rule was received in step 332.

In step 350, the DAF generates a resource requirement for the target network function based on the received information about traffic flows carried over the communication channel. In step 360, the DAF sends the generated resource requirement to a Network Functions Virtualisation Orchestration (NFVO) function. This may enable the resourcing of additional instances of one or more functions by the NFVO.

The method 200 or 300, performed by a DAF, may be complemented by one or more methods performed at a NF, LB and/or Support System, as described below.

Figure 4:
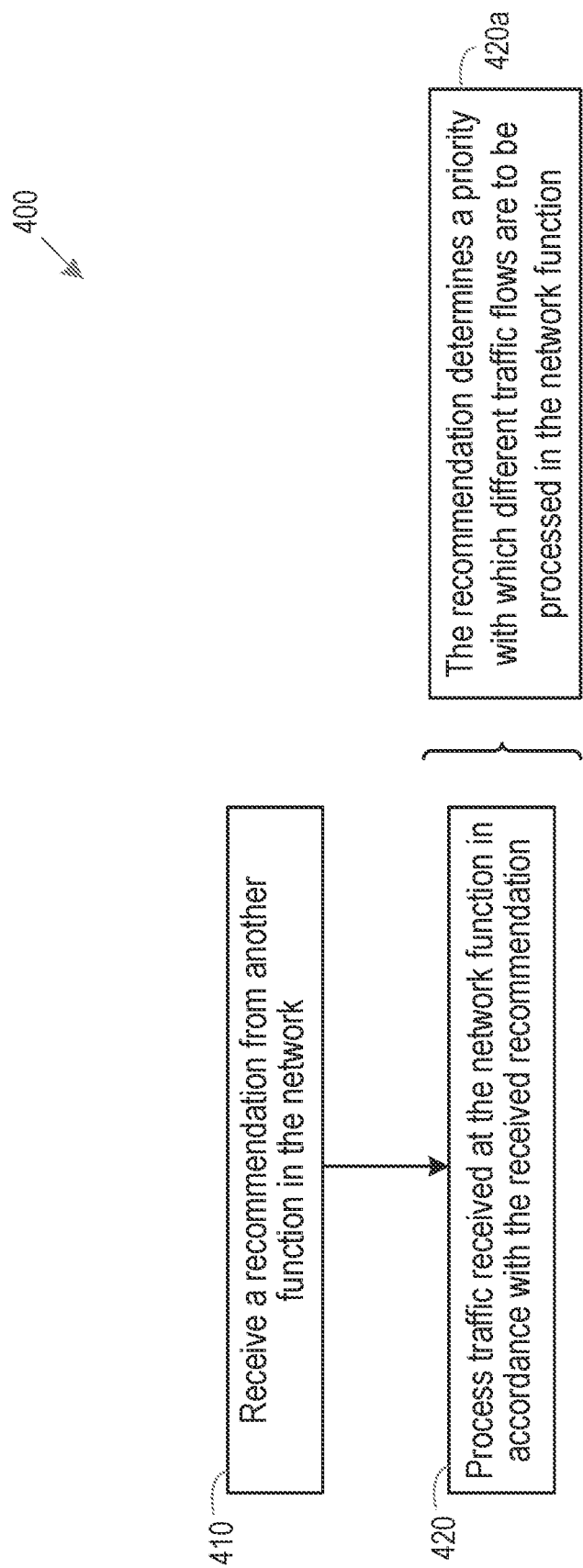

FIG. 4 is a flow chart illustrating process steps in a method 400 for managing traffic processed by a target Network Function (NF) of a communication network, wherein the target NF transmits and receives traffic over a communication channel that carries traffic between network functions and application functions. The communication channel may comprise a control plane communication channel that carries control plane messages between network functions and/or user plane data packets related to end user applications.

The method 400 is performed by the target NF, which may comprise any one or more of an AMF, SMF, PCF, NEF. As discussed above, each of these functions transmit and receive data over a communication channel that carries traffic between network functions and application functions. In the case of AMF, SMF and PCF, the AF communicates with the NEF that is part of this communication channel. In case of AF to PCF, the communication channel also includes a Data Base (UDR). For example, when an AF sends data to a PCF, the AF contacts a NEF that stores data in a UDR and a service notification is sent to the PCF from the UDR. Thus a communication channel exists between the AF/NEF and the PCF.

Referring to FIG. 4, the method 400 comprises, in a first step 410, receiving a recommendation from another function in the network. In step 420, the method comprises processing traffic received at the network function over the communication channel in accordance with the received recommendation. As shown at 420a, the recommendation determines a priority with which different traffic flows are to be processed in the network function. As discussed above, the recommendation may in some examples comprise a policy control rule.

Figure 5:
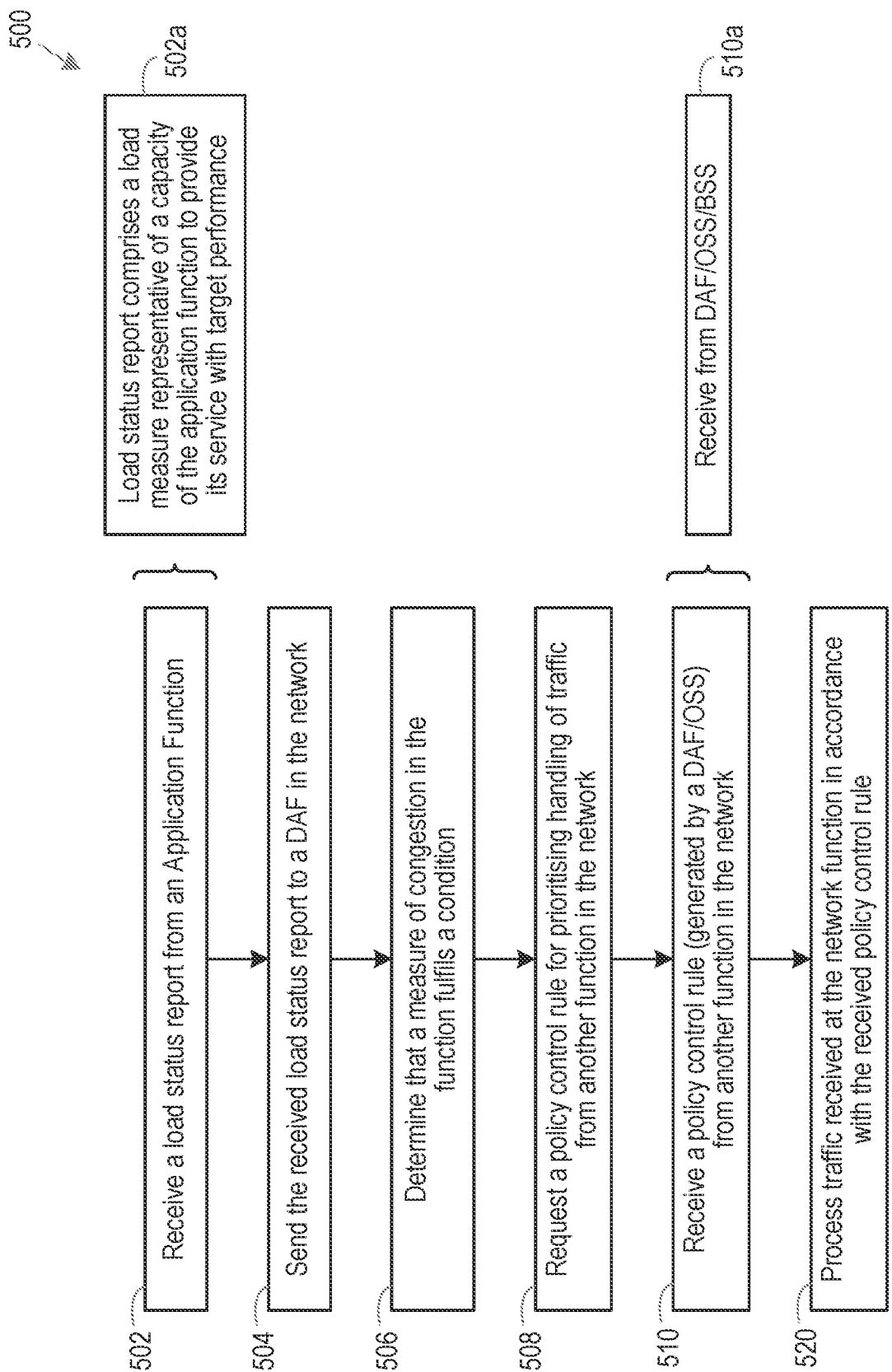

FIG. 5 is a flow chart illustrating process steps in another example of method 500 for managing traffic processed by a target network function of a communication network, wherein the target network function transmits and receives traffic over a communication channel that carries traffic between network functions and application functions. The steps of the method 500 illustrate one way in which the steps of the method 400 may be implemented and supplemented to achieve the above discussed and additional functionality. As for the method 400, the communication channel may comprise a control plane communication channel that carries control plane messages between network functions and/or user plane data packets related to end user applications.

The method 500 is performed by the target NF, which may comprise any one or more of an AMF, SMF, PCF and/or NEF as discussed above. Referring to FIG. 5, in an example in which the target NF comprises a NEF, in a first step 502, the NEF receives a load status report from an Application Function and, in step 504, the NEF sends the received load status report to a DAF in the network. The DAF may be a NWDAF and/or a MDAF, as discussed above with reference to FIGS. 2 and 3a. As illustrated at 502a, the load status report may comprise a load measure representative of a capacity of the application function to provide its service with target performance. Different options for the load measure may include load status of an application server, collated load profile of an application server, congestion status of underlying apparatus, etc. As discussed above with reference to method 300, this information may be used by the DAF to establish a priority for traffic flows on which a recommendation may be based.

In step 506, the target NF, which may be a NEF or any of the above discussed possible target NFs, determines that a measure of congestion in the function fulfils a condition. The measure of congestion in the function may for example comprise CPU load and/or incoming buffer levels, and the condition may comprise a threshold value. In step 508, the target NF requests a policy control rule for prioritising handling of traffic from another function in the network. The other function in the network may be the DAF or may be a LB, OSS or BSS.

In step 510, the target NF receives a recommendation from another function in the network. As illustrated at 510, the recommendation may comprise a policy control rule which has been generated by a DAF on the basis of information about traffic flows carried over the communication channel. Such information may include contractual information for an AF subscriber identity or NS associated with the traffic flows and/or revenue information for an AF, subscriber identity or NS associated with the traffic flows. As illustrated at 510a, the recommendation may be received from at least one of the DAF, an OSS or a BSS.

In step 520, the target NF processes traffic received at the NF over the communication channel in accordance with the received recommendation. As discussed above, the recommendation may comprise a policy control rule which applied by the target NF.

Figure 6:
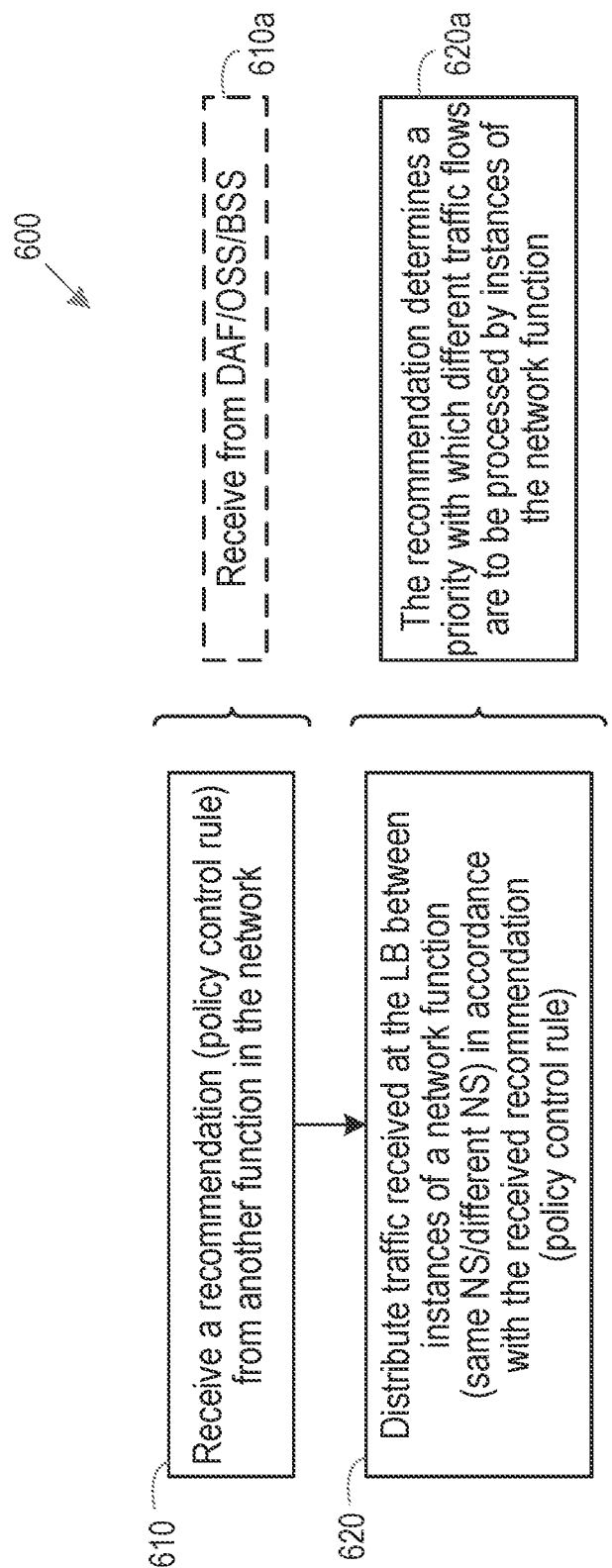

FIG. 6 is a flow chart illustrating process steps in a method 600 for managing traffic processed by a target Network Function (NF) of a communication network, wherein the target NF transmits and receives traffic over a communication channel that carries traffic between network functions and application functions. The communication channel may comprise a control plane communication channel that carries control plane messages between network functions and/or user plane data packets related to end user applications.

The target NF may comprise any one or more of an AMF, SMF, PCF, NEF as discussed above. The method 600 is performed by a Load Balancer (LB), which may be a virtualised function and may be external to the target NF, instances of which it is distributing traffic between, or may be internal to the target NF. The LB may be instantiated at a VNF, network slice or PLMN level.

Referring to FIG. 6, the method 600 comprises, in step 610, receiving a recommendation from another function in the network. The recommendation may in some examples comprise a policy control rule. As illustrated at 610a, the recommendation may be received from at least one of a DAF, an OSS and/or a BSS. The recommendation may be generated by a DAF and may be generated on the basis of information about traffic flows carried over the communication channel that comprises at least one of contractual information for an AF, subscriber identity or NS associated with the traffic flows and/or revenue information for an AF, subscriber identity or NS associated with the traffic flows.

In step 620, the method 600 comprises distributing traffic received at the LB between instances of the target network function in accordance with the received recommendation. As illustrated at 620a, the recommendation determines a priority with which different traffic flows are to be processed by instances of the target network function. The different instances of the target network function may be configured in different locations (local/central) and/or may be configured to handle traffic of different priority or value levels. In some examples, the instances of the target network function are configured to transmit and receive traffic in different network slices.

Figure 7:
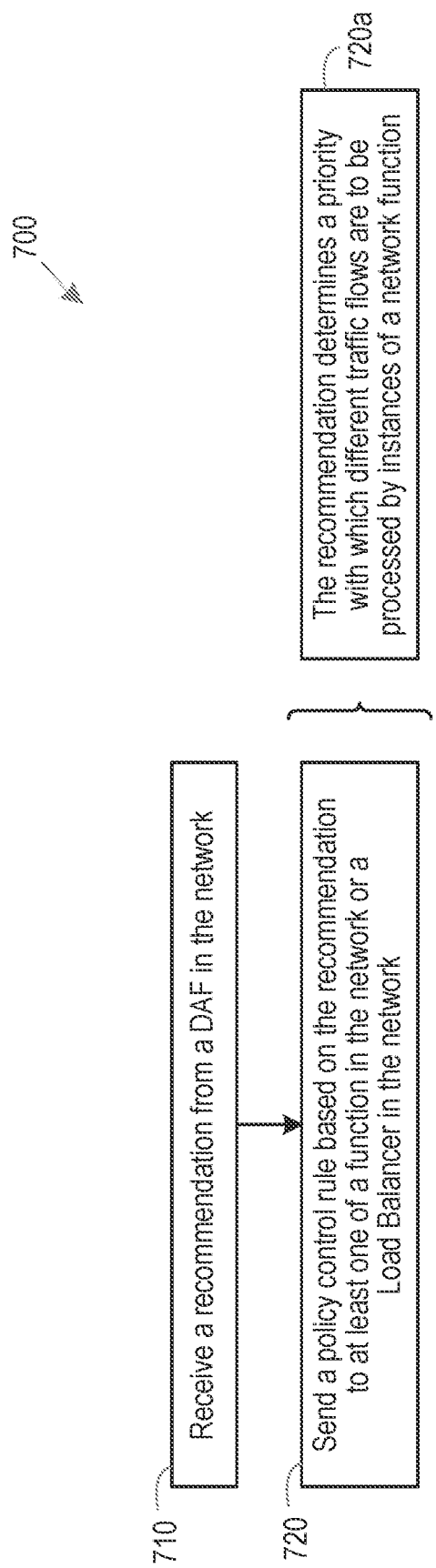

FIG. 7 is a flow chart illustrating process steps in a method 700 for managing traffic processed by a target Network Function (NF) of a communication network, wherein the target NF transmits and receives traffic over a communication channel that carries traffic between network functions and application functions. The communication channel may comprise a control plane communication channel that carries control plane messages between network functions and/or user plane data packets related to end user applications.

The target NF may comprise any one or more of an AMF, SMF, PCF, NEF as discussed above. The method 700 is performed by a Support System in a communication network, which may be an Operations Support System (OSS) or Business Support System (BSS), as discussed in further detail below with reference to FIG. 8. Referring to FIG. 7, the method 700 comprises, in a first step 710, receiving a recommendation from a DAF in the network, and, in step 720, sending a policy control rule based on the received recommendation to at least one of the target NF and/or a Load Balancer (LB) in the network. As illustrated at 720a, the recommendation determines a priority with which different traffic flows are to be processed by instances of the target network function. According to some examples of the method 700, the recommendation may comprise a policy control rule, and step 720 may comprise sending the received policy control rule. In other examples, the method 700 may further comprise generating a policy control rule for sending on the basis of the received recommendation.

Figure 8:
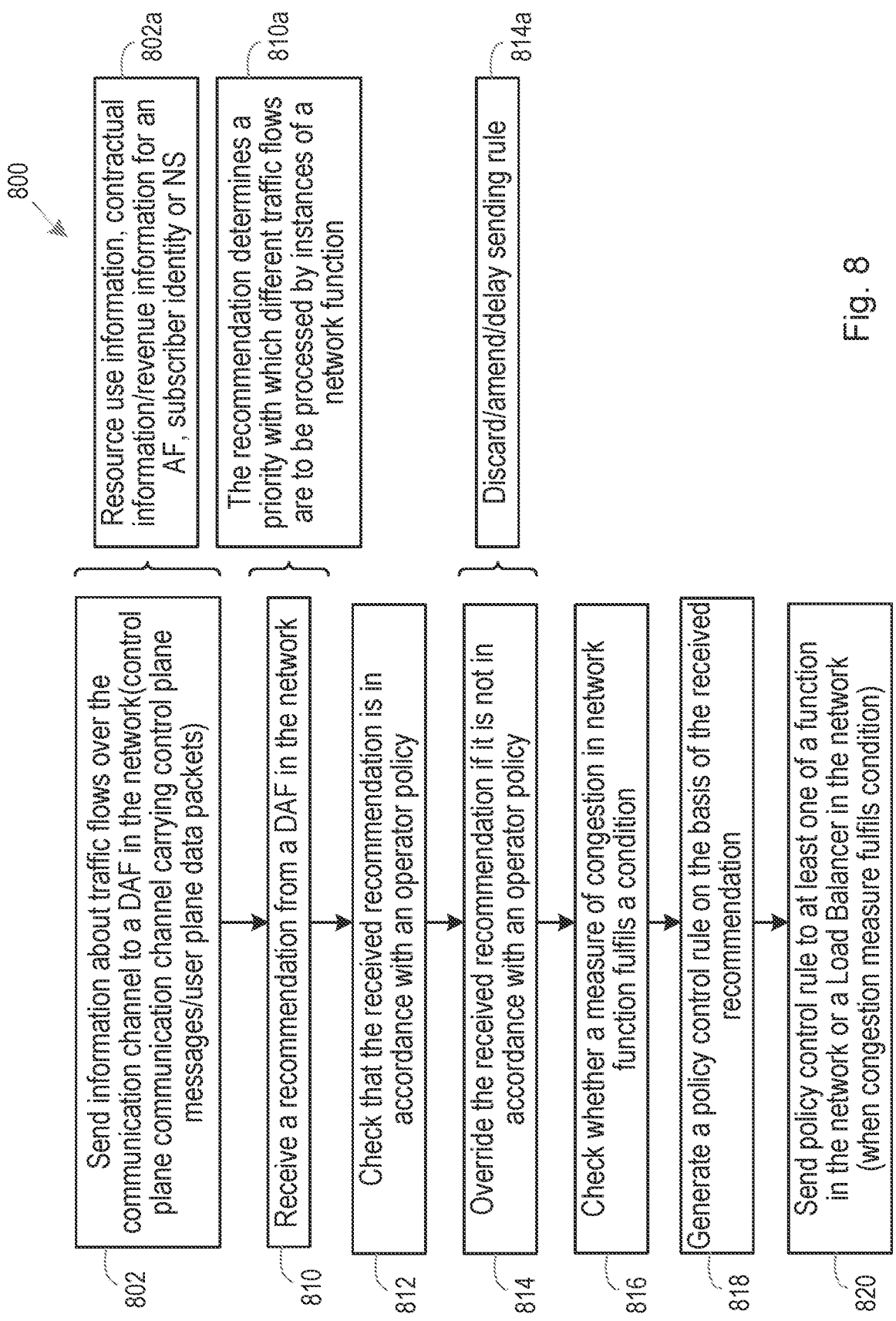

FIG. 8 is a flow chart illustrating process steps in another example of method 800 for managing traffic processed by a target network function of a communication network, wherein the target network function transmits and receives traffic over a communication channel that carries traffic between network functions and application functions. The steps of the method 800 illustrate one way in which the steps of the method 700 may be implemented and supplemented to achieve the above discussed and additional functionality. As for the method 700, the communication channel may comprise a control plane communication channel that carries control plane messages between network functions and/or user plane data packets related to end user applications.

The target NF may comprise any one or more of an AMF, SMF, PCF and/or NEF as discussed above. The method 800 is performed by a Support System in a communication network, which may be an Operations Support System (OSS) or Business Support System (BSS), as discussed in further detail below. Referring to FIG. 8, in a first step 802, the Support System sends information about traffic flows carried over the communication channel to a DAF in the network, the information comprising at least one of resource use information associated with the traffic flows, contractual information for an AF, subscriber identity or NS associated with the traffic flows and/or revenue information for an AF, subscriber identity or NS associated with the traffic flows, as illustrated at 802a.

In examples in which the Support System comprises an OSS, the information about traffic flows carried over the communication channel may comprise at least one of a load measure for resources in the network associated with the traffic flows, a variance parameter indicating variance between maximum and minimum values of the load measure, a service assurance measure for services provided via the traffic flows, contractual information for an AF, subscriber identity or NS associated with the traffic flows, and/or a NS associated with the traffic flows.

In examples in which the Support System comprises a BSS, the information about traffic flows carried over the communication channel may comprise at least one of contractual information for an AF, subscriber identity or NS associated with the traffic flows and/or revenue information for an AF, subscriber identity or NS associated with the traffic flows.

In step 810, the Support System receives a recommendation from a DAF in the network. As illustrated at 810a, the recommendation determines a priority with which different traffic flows are to be processed by instances of the target network function. As discussed above, the recommendation may in some examples comprise a policy control rule. In other examples, the DAF recommendation may comprise a recommended priority level for traffic belonging to a NS in which the target NF transmits and receives traffic. The recommended priority level may be used to mitigate an established risk of performance degradation in the NS, which may result in failure to meet service assurance levels, owing to congestion. The recommendation may also consider relation to other NSs that uses the same NF. It will be appreciated that NS performance is described by KPIs that refer to a Service Level Agreement (SLA). The SLA describes agreed limits for measurable performance parameters relating a network slice. Such parameters may include total aggregated max bit rate, average bit rate measured under a defined time period, packet loss rate under a defined time period, etc. If performance is predicted to be degraded for a NS below a threshold value, the DAF may deliver a recommended priority level for traffic belonging to the NS that may be used to mitigate the risk of performance degradation below the threshold.

In step 812, the Support System checks that the received recommendation is in accordance with an operator policy and, in step 814, the Support System overrides the received recommendation if it is not in accordance with an operator policy. As illustrated at 814a, overriding may comprise discarding the received recommendation before sending a policy control rule, or may comprise imposing a delay before sending the policy control rule for application, or may comprise amending the received recommendation before sending the policy control rule. Amending the recommendation may comprise amending the policy control rule itself if the received recommendation comprises a policy control rule, or may comprise amending the recommendation before generating a policy control rule based on the recommendation.

In step 816, the Support System may check whether a measure of congestion in the target network function fulfils a condition, which condition may determine whether or not it is appropriate to send a new policy control rule to the target network function.

In step 818, if the recommendation comprises a recommendation other than a policy control rule, the Support System generates a policy control rule on the basis of the received recommendation. In step 820, the Support System sends a policy control rule based on the received recommendation to at least one of the target function in the network and/or a Load Balancer in the network.

The methods 200 to 800 described above may cooperate to enable prioritization of traffic over a communication channel between Network Functions and Application Functions. The channel may be a control plane channel, which may carry control plane messages between network functions and/or user plane data packets related to end user applications. The following discussion illustrates how such methods may be implemented through example signaling flow and use cases.

It will be appreciated that the presently described methods enable traffic priority management so as to ensure continuity of revenue streams and/or service assurance. This may be achieved through prioritizing of traffic at NF level (as part of a VNF implementation) and/or by increasing capacity for the NF by scaling the VNF. The following discussion considers implementation of such methods to achieve a two phase process including:

a) Collection Phase during which relevant information from different network functions (NFs) and Application Functions (AFs) is provided to a MDAF/NWDAF to ensure that the DAF has information available for implementing intelligence and automation b) Post Collection Phase during which the information available to or derived at the MDAF/NWDAF is for optimized decision making in establishing priority and recommendations.

Collection Phase

Populating the relevant information from different network functions (NFs) into NWDAF/MDAF A large amount of potentially relevant information for revenue/service assurance based traffic prioritization is available in individual network functions but in conventional network deployments this information is not shared with any central node for informed and correlated decision making. Aspects of the present disclosure propose to collect this information by sending it to the DAF. According to different examples of the present disclosure, the following information may be collected:
 a. OSS/EMS provides resource use to the NWDAF/MDAF, including for example Radio Resource use, Transport resource use, Congestion etc.
 b. Application Functions associated with different Slices provide use and congestion information.
 c. BSS system shares user specific revenue information including monthly, weekly and yearly trends and including information about associated subscribers.
 d. Information related to mapping of various VNFs to Network Slices is provisioned in NWDAF/MDAF.

It will be appreciated that the MDAF/NWDAF nodes are analytics nodes introduced in 5G which are intended to support the Automation and Analytics required for 5G architecture to be agile and dynamic; scaling out and in based on dynamic network conditions.

Provision of Network Congestion Information by OSS

In addition to overload in the target NF (eg the NEF), there may be a congestion situation in other elements or parts of the network, including in the transport network, in physical or virtual switches, Radio conditions etc.

3GPP has specified a Network Resource function (NRF) that collects resource information from core network nodes (following the service based architecture). This function is currently limited in the nodes considered, but in future the NRF may be used either in place of or in combination with an OSS for the functions described below.

Congestion periods (traffic spikes) can be predicted, in both timing and intensity by an analytics AI function in the DAF. These predictions may be based on appropriate information from network nodes and the OSS. These predictions may then be used as part of the priority decisions in traffic handling (i.e. in internal NEF implementation, or as part of a load balancer policy in how to handle priorities between NEF instances). Different elements of the network including the transport network and RAN may provide KPI information to a centralized OSS, which can then relay this information to the MDAF/NWDAF for analysis and decision making. In this manner, whenever a target network function such as a NEF is predicted to reach or reaching a congestion/overload situation, End to End network information can be used for decision making regarding how to prioritize traffic processed by the NEF. This information will also be stored in the MDAF/NWDAF node so that Application function specific information and NF information can be correlated at one network function (NWDAF/MDAF). This provides an End to End view which may enable more effective traffic priority decisions, and/or decisions regarding expansion of functions. It will be appreciated that the present disclosure focuses primarily on priority decisions between traffic flows in the control plane domain. Priorities are established between network slices and between different groups of subscriptions and UEs that generate traffic belonging to different business agreements. The business agreements may be with third parties providing end user Application Functions. In addition, priorities between users within the same network slice, and same business agreement and/or end user AF, may be established.

Figure 9:
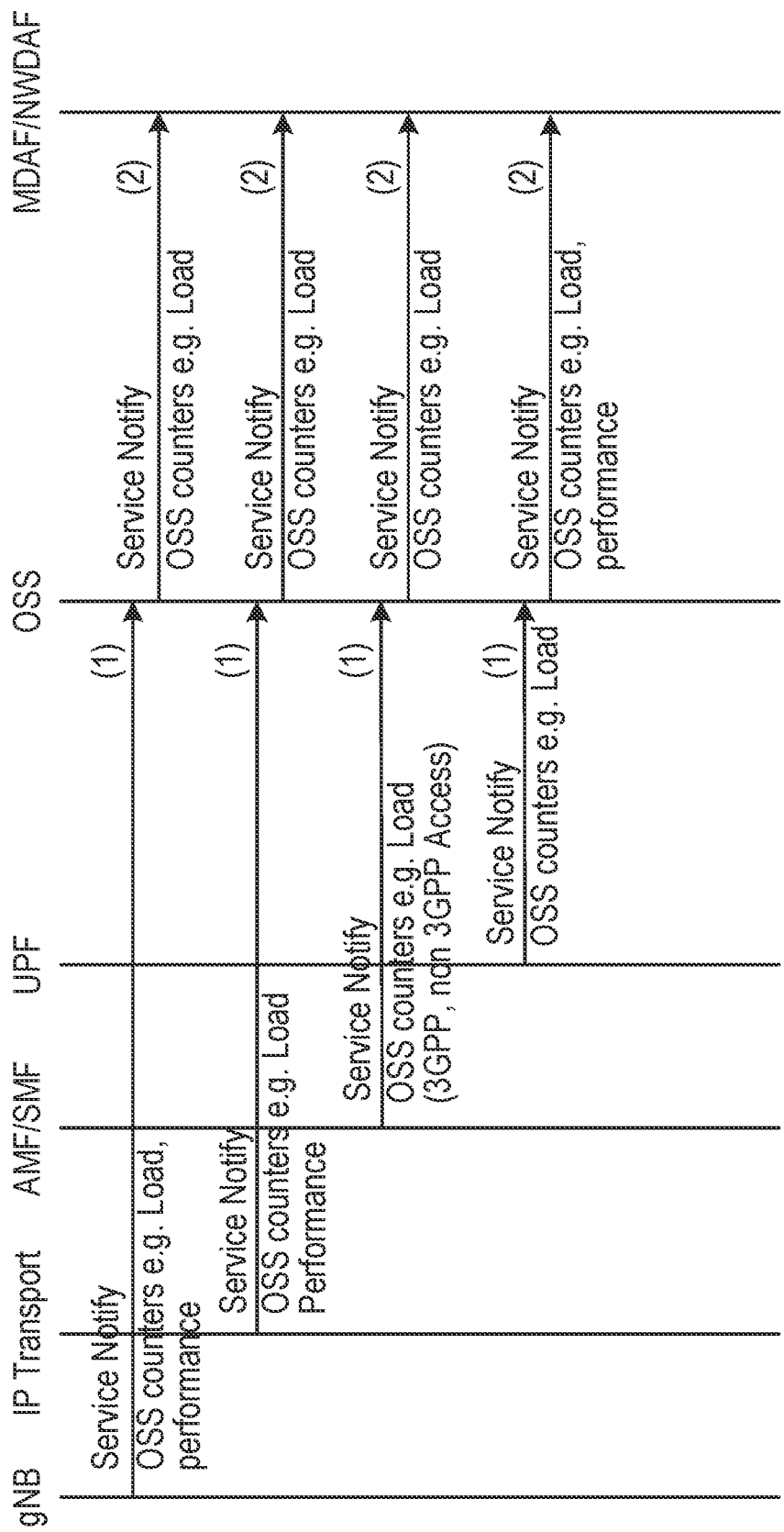
FIG. 9 is a message flow diagram illustrating OSS Inputs to a MDAF/NWDAF node.

FIG. 9 is a message flow diagram illustrating OSS Inputs to a MDAF/NWDAF node. FIG. 9 illustrates the following call flow:
 1. Different Network Elements provide performance related data to the OSS. The performance data is an average KPI value for a given time period. It is proposed to also add a traffic variance parameter that gives information on how large the variance is between minimum and maximum in a reported time frame and the frequency of minimum and maximum values. As load information tends to fluctuate considerably, the "variance" parameter can be particularly useful for prediction of congestion situations.
 2. OSS updates the MDAF/NWDAF with relevant performance information, and impacted instance(s) of network slice(s), including service assurance measures for the network slice. The MDAF/NWDAF may then predict resource congestion levels for a given time period for network slices and network elements which may contribute to the overall congestion within or between instance(s) of network slices. Impacted NS instances are defined by resource congestion or a service assurance measure (for example that the delivered network service is below accepted level even if resource congestion is not reported, or that resource congestion is reported but that the provided service level is within acceded values even if there are short periods of resource congestion).

Application Function Status Sharing

When a NEF is overloaded, there may additionally be congestion/overload at AF level owing to high traffic load. Information about AF congestion may assist with making better decisions. For example, if an AF is 90% overloaded, it would be desirable to cease connecting new users, as this may further impact the experience of existing customers.

When an Application Function is overloaded, it reports this status in real-time to the NEF. The NEF may report this to the MDAF/NWDAF, which stores this information in a repository to be used in future transactions. The MDAF/NWDAF may for example store overload status of an Application Server with 90% CPU load. The status report may be a collated load profile of several properties (CPU, Memory, Network), collected over time reaching a threshold value that triggers the report. It will be understood that the NEF is an optional node if the AF is a trusted node in the operator's environment. According to ETSI MEC standards, an Application Server for a third party can be co-hosted by an operator on his environment, or the Application server can be hosted in the third party data center.

Figure 10:
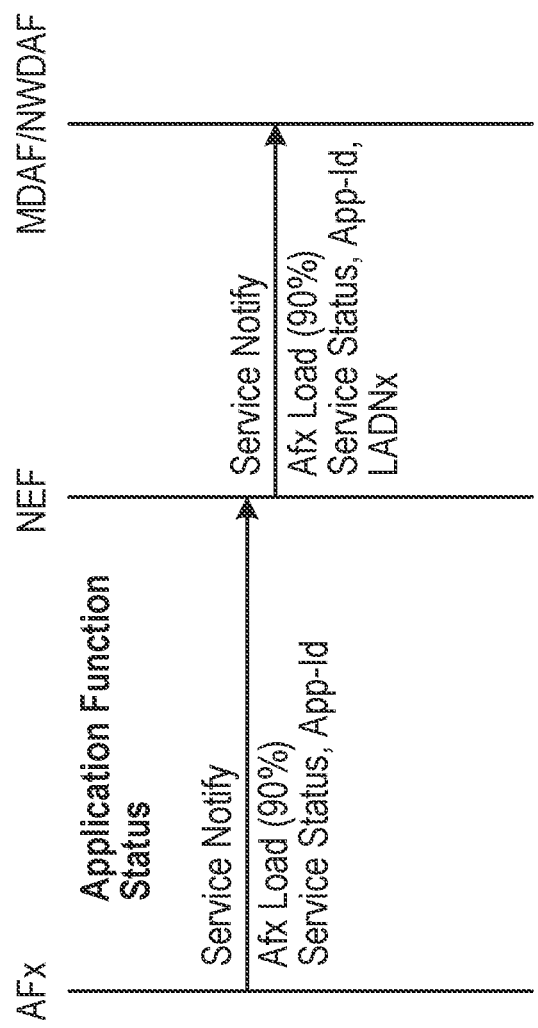
FIG. 10 is a message flow diagram illustrating population of service and status of an Application Function to a NWDAF/MDAF node.

FIG. 10 is a message flow diagram illustrating population of service and status of an Application Function AFx to the NWDAF/MDAF. In the illustrated example, of "AFx Load 90%", it may be understood that the actual server that the application is running on has reached resource use level of 90%, or that the application has detected that application congestion is experienced owing to resource congestion in the underlying infrastructure. In the later example of application congestion, the application is not able to deliver its service with optimal performance. As an illustrating example, an IoT application may collect the status of millions of devises every 5 minutes (this may be data from IoT devices and also mobility information from the network on mobile devices). The IoT application performs different analysis for control and/or warning signals. Owing to resource congestion experienced by the application precision is predicted to be reduced and so the application adjusts the collection and analysis frequency to every e.g. 10 minutes. Application congestion may be by own server capacity issues or End to End network resource capacity issues.

Figure 11:
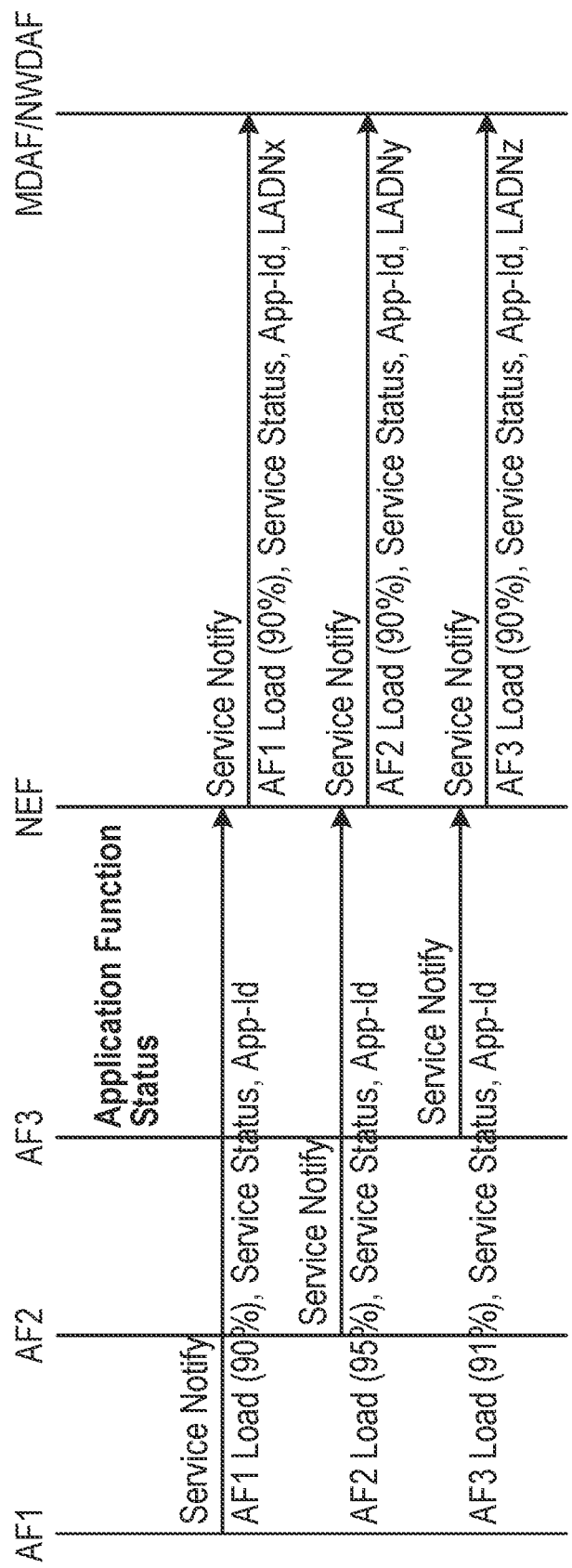
FIG. 11 is a message flow diagram showing population of AF load and service status from different AFs to a NWDAF/MDAF node.

FIG. 11 illustrates a message flow diagram showing population of AF load and service status from different AFs to the NWDAF/MDAF. This data is saved in the MDAF/NWDAF as a historical data set. The MDAF/NWDAF then uses this data for deciding on VNF/Network Slice Expansion. This data is also used for predicting overload situation in the future by analyzing past trends.

Table 1 illustrates Application Function Load Information that may be stored in the NWDAF/MDAF.

TABLE 1

| Application Function | Time | Load | Service Deterioration |
| --- | --- | --- | --- |
| AF Server 1 | 2018-10-13: 05:15:00 | 90% | No |
| AF Server 2 | 2018-10-13: 05:15:00 | 95% | Yes |
| AF Server 3 | 2018-10-13: 05:15:00 | 91% | No |

Provision of User Specific Revenue Information by BSS

Services provided by a communication network operator need to be monetized and this process is managed by BSS systems. Communication Service Providers (CSPs) may seek to base prioritization decisions relating to different customers/end users on the revenue rather than on specific static configurations. Many CSPs are moving toward Converged charging, in which all charging information for Prepaid as well as Postpaid subscribers is available at the BSS in real-time. This information can be used to calculate the actual revenue generated by a subscriber by taking into account all the network usage and purchases made. This information may also be provided to and stored in the MDAF/NWDAF node, so that BSS information can be correlated with congestion information at one network function (NWDAF/MDAF) to have an overview of end to end services for making informed prioritization decisions.

Figure 12:
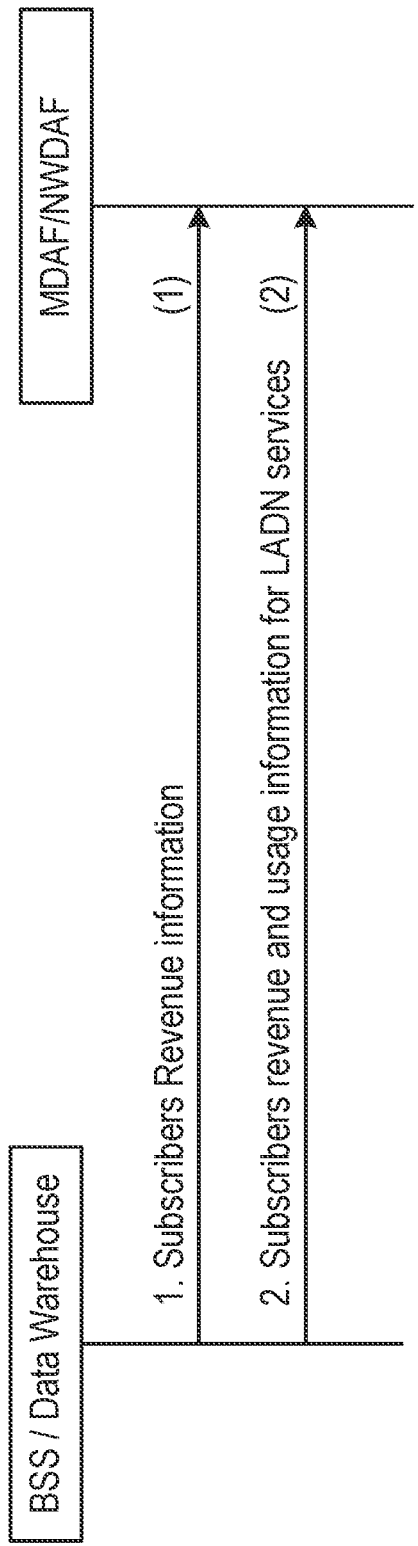
FIGS. 12 and 13 are message flow diagrams illustrating a BSS/Data Warehouse providing information to a NWDAF/MDAF node

FIG. 12 is a message flow diagram illustrating a BSS/Data Warehouse providing information to a NWDAF/MDAF node. The call flow is as follows:
1. Data including subscriber Revenue information e.g. Monthly usage & recharge information is sent to the MDAF/NWDAF
2. Data including subscriber revenue & usage data specific to real-time usage is sent to the MDAF/NWDAF.

Table 2 illustrates different option for prioritizing subscribers:

TABLE 2

| Parameters | Subscriber 1 | Subscriber 2 | Subscriber 3 |
| --- | --- | --- | --- |
| Profile | Silver | Gold | Platinum |
| Monthly Pack Value | 30 USD | 40 USD | 50 USD |
| Revenue Real-time (top up) | 23 USD | 8 USD | 0 USD |
| Music App Subscription | Yes | Yes | No |
| TV App Subscription | Yes | No | No |
| In-App Purchases | Yes | No | No |
| Calculated Priority | High | Low | Medium |

Revenue generated by a subscriber may not be reflected completely in their subscription package. Additional services may be bought via operators including for example Music or TV subscriptions. These services may be owned by the operator and can be paid for as part of the operator bill (postpaid) or from a recharge amount (prepaid). These services provide additional revenue and can be subscribed/unsubscribed on the fly. In Table 2 above, subscriber 1 has a lower data subscription (Silver) than subscriber 3 (Platinum), but by making purchases on additional services, subscriber 1 may be generating more revenue than subscriber 3.

Provision of AF Specific Revenue Information by BSS

An Application Function (AF) uses network resources based on incoming requests via a NEF. AFs may also be hosted in the CSP data center itself. The services provided by the CSP to an AF are monetized in a process that is also managed by the BSS.

Revenue from AF providers may include billing for use of network resources based on incoming requests and/or it may include hosting costs. A CSP may seek to base prioritization decisions relating to different AFs on the revenue generated by the AF rather than on specific static configurations. This information may be provided to and stored in the MDAF/NWDAF node, to be taken into account in prioritization decisions.

Figure 13:
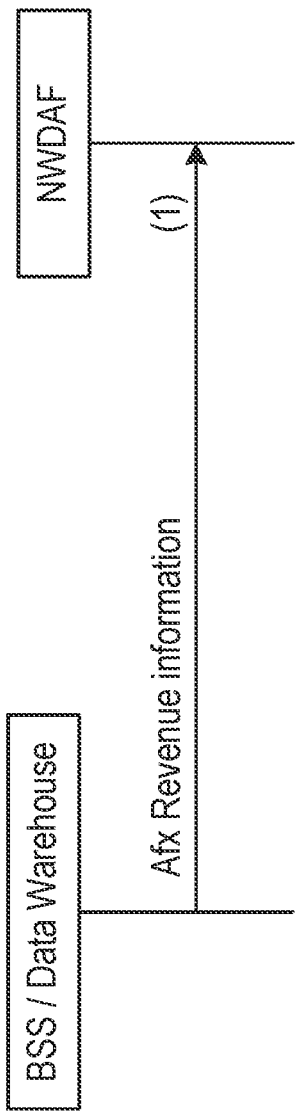

FIG. 13 is a message flow diagram illustrating a BSS/Data Warehouse providing AF revenue information to a NWDAF/MDAF. This information includes AF monthly (package) usage and additional revenue. Additional revenue may be generated by AFs through the use of services beyond a purchased package. Different resources to be monitored for such revenue can include CPU, RAM, Storage, Transactions, Network Bandwidth etc.

Table 3 illustrates different ways to prioritize Application Functions:

TABLE 3

| Parameters | AF1 | AF2 | AF3 |
| --- | --- | --- | --- |
| Profile | Silver | Gold | Platinum |
| Monthly Revenue | 40K USD | 50K USD | 60K USD |
| Revenue Real-time (Expansion) | 10K USD | 5K USD | 0 USD |
| Profit Sharing | Yes | No | No |
| Calculated Priority | High | Low | Medium |

Post Collection Phase

In the Post collection phase, collected data is analyzed and used to make policy decisions. These decisions are relevant for prioritizing user and Application Function Traffic.

As highlighted earlier, the MDAF/NWDAF node has been populated with relevant information including, but not limited to load status and revenue information.

Examples of the present disclosure now propose prioritization of requests based on analysis performed by the NWDAF/MDAF. Each AF Request has an accompanying resource requirement for Radio resources, Application Function resources and a transport network. These factors are considered while prioritizing the NEF Resources.

Post collection actions for a target NF in the form of a NEF may include:
  a. MDAF/NWDAF analyzes the information from the collection phase and historical data.
  b. When NEF reaches congestion state (for example CPU load>70%, or in-coming buffer depth) it fetches traffic prioritization recommendation from the NWDAF/MDAF and sets policy for traffic priority scheduling in the NEF accordingly.
  c. All NEF traffic is then handled according to the MDAF/NWDAF recommendation.

Traffic management may alternatively or additionally be conducted outside of the NEF via a Load Balancer so that traffic is distributed among different NF nodes or instances which are segregated based on criticality, load or location:
  a. MDAF/NWDAF analyzes the information from the collection phase and historical data.
  b. MDAF/NWDAF dynamically delivers recommendations to BSS and OSS to maintain business revenue, service assurance etc.
  c. OSS, based on input from MDAF/NWDAF and BSS, updates policy in a Load Balancer.

d. Load Balancer ensures that traffic to instances of the NF (for example the NEF) is managed as per the configured policy conditions.

The NEF will receive requests from AFs, NFs or other management entities. Currently, the NEF takes a decision on whether or not to fulfil requests on the basis of available resources and static rules. Aspects of the present disclosure propose a further check with a MDAF/NWDAF for these requests. The MDAF/NWDAF is able to consider End to End factors using the information obtained during the collection phase. The MDAF/NWDAF then provides a recommendation, which may be further update by a decision from an OSS or BSS. The OSS/BSS may then update policies for the NF/NEF traffic. It will be appreciated that manual override policy rules in the OSS may override the recommendations that MDAF/NWDAF delivers, and the manual rules may also be part of the update of load balancer rules.

Prioritization of Traffic Inside a NEF (Via NWDAF/MDAF)

In this implementation of the disclosed methods, the NEF prioritizes traffic based on MDAF/NWDAF recommendations. The present examples considers a situation in which the NEF selects traffic based on originating AF. Selection can also be based on other parameters including User Subscription, Network Slice and Message Type (Critical, low latency), etc.

Figure 14:
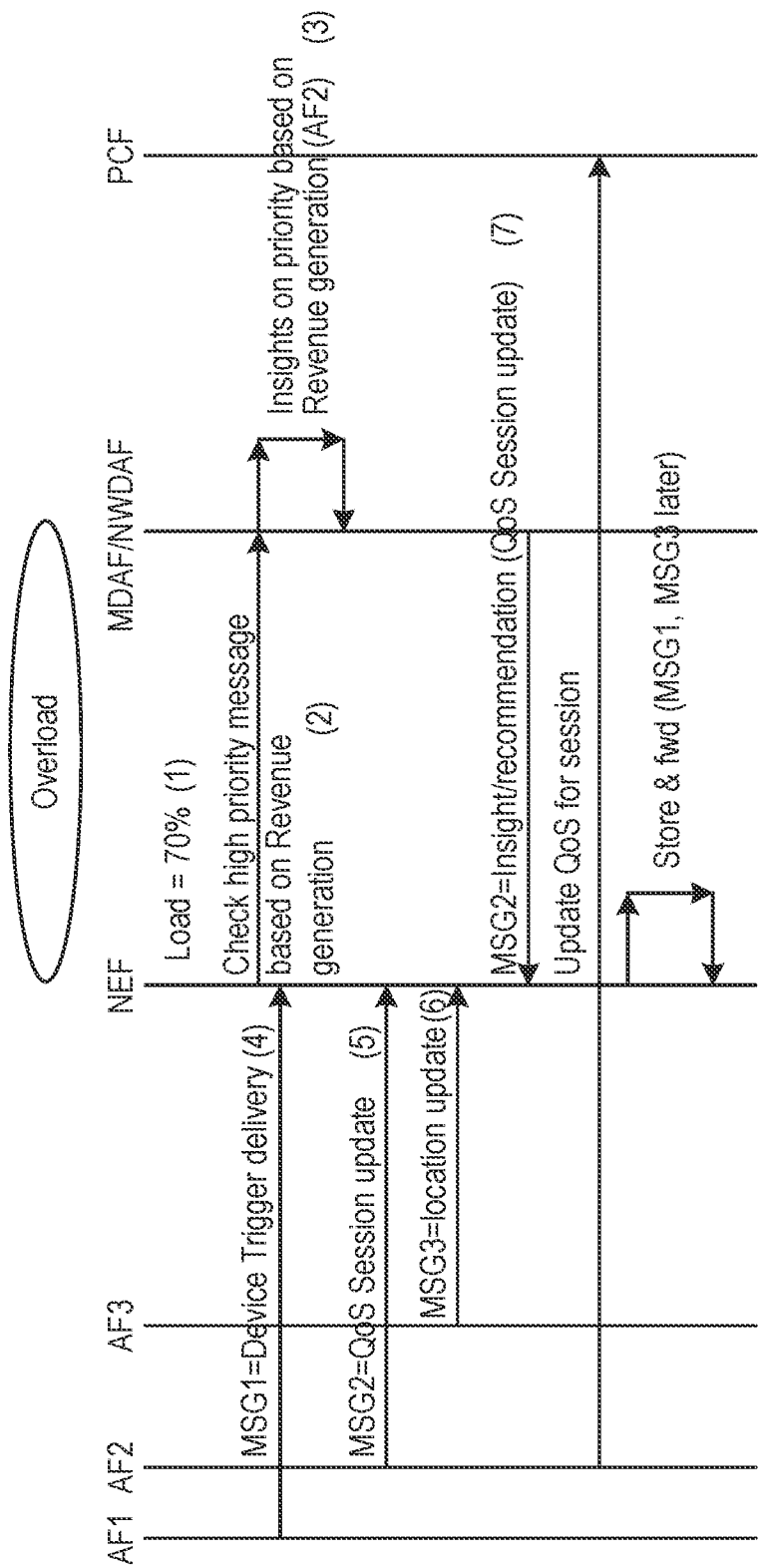
FIG. 14 is a message flow diagram illustrating traffic prioritization inside a NEF.

FIG. 14 is a message flow diagram illustrating traffic prioritization inside a NEF. The call flow is as follows:
1. The NEF detects that it is experiencing a congestion situation on the basis of various parameters including CPU load. As part of overload control, the NEF decides to implement traffic prioritization so that low priority traffic can be delayed or discarded, so ensuring the NEF is able to provide services in a stable manner to high priority services and subscribers without hampering of probability of getting further overloaded.
2. In order to delay or discard traffic, the NEF can randomly select the traffic or select based on session state (existing or new sessions). However, this does not take into account end to end network impact and high level revenue requirements. To insure that higher revenue generating subscribers and applications are accorded higher priority and network outage is minimized, the NEF checks with NWDAF to obtain traffic prioritization recommendations to update the traffic priority rules inside the NEF.
3. The NWDAF provides a recommendation to prioritize the traffic from AF2, based on analysis of information obtained in the collection phase.
4. The NEF receives a message from AF1 regarding message delivery to MTC device.
5. The NEF receives a message from AF2 regarding QoS Session update for an existing session.
6. The NEF receives a location related query for one of the subscribers from AF3.
7. Based on the recommendation received from NWDAF, the NEF processes the request from AF2 for update of QoS Sessions.
8. The NEF stores the requests from AF1 & AF3 to process at a later stage when CPU load reduces to normal levels. The NEF may also choose to discard the requests from AF1 & AF3 based on NEF policy.

Prioritization of Traffic Among Multiple NEFs by a Load Balancer

In this implementation of the disclosed methods, an external Load Balancer service prioritizes the traffic based on MDAF/NWDAF recommendations. The Load Balancer may be with the Micro Services based Architecture and Dynamic orchestration (e.g. Kubernetes), or an external entity that is delivered as a Load Balancer as a service, or a load balancer as external node element. The load balancer is used to manage traffic from the outside world to the Network Function, which in the present example comprises NEF instances.

Network architecture as described above can be foreseen for 5G Core networks, as the NEF will be providing an interface towards 3GPP Applications and also to internal interfaces with 5G Core. A Load Balancer function may be included and used in real life deployments.

This Load Balancer can be used to manage traffic towards NEF nodes dynamically. Multiple NEF nodes may be included for any one or more of several different reasons including:
1. To provide higher capacity with multiple instances
2. To segregate traffic by instantiating different NEFs for different types of services
3. To provide different NEFs for different priority subscribers and Application Functions
4. To provide a different set of NEFs for central processing or based on Location (LADN) or network Slice. The relevance of a NEF that is distributed in LADN and for Mobile Edge Computing (MEC) is that for these use cases the AF is always deployed at the edge, so motivating deployment of the NEF at the edge also, both for best performance and to meet AF requirements for deployments at edge.

To illustrate this implementation, a scenario of NEF deployment at two location is considered, the locations being a central and a local deployment. Separate NEF instances are also considered for Low, medium and high priority traffic. Allocation of NEF instances can also be performed based on other parameters including Network Slice, LADN, service type etc.

Figure 15:
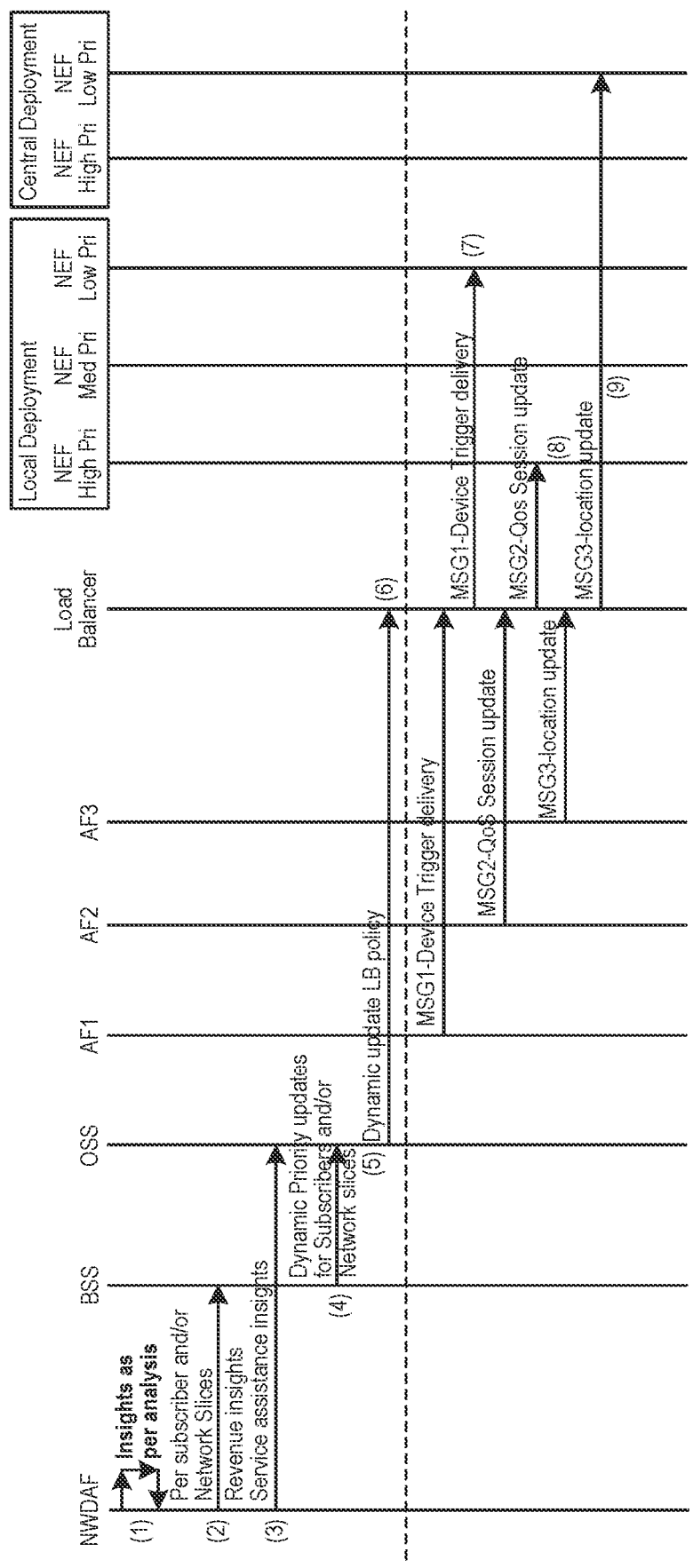
FIG. 15 is a message flow diagram illustrating load balancing between multiple NEF instances.

FIG. 15 is a message flow diagram illustrating load balancing between multiple NEF instances. The call flow is as follows:
1. The MDAF/NWDAF analyzes information compiled from different sources as described above with reference to the Collection phase.
2. The MDAF/NWDAF provides revenue based recommendations to the BSS to incorporate in its decision-making logic. These recommendations may include the information related to different subscribers, AFs and Network slices etc.
3. The MDAF/NWDAF provides service assurance related recommendations to the OSS. These recommendations may include session lengths, peak times and SLA related information.
4. The BSS also provides revenue related updates to the OSS in real-time.
5. Based on these above recommendations/triggers, the OSS updates the policy in the Load Balancer. This policy includes rules for traffic distribution among different NEFs and locations. This may also include segregation based on originating traffic and network slice etc.
6. Once the policy is updated in Load Balancer, it starts processing the new requests according to the policy.
7. A request from AF1, regarding device delivery is routed to low priority local NEF. This may provide low latency and low importance.
8. A request from AF2, regarding session QoS is routed to high priority local NEF. This may provide low latency and high importance.

9. A request from AF3, regarding location is routed to central NEF. This may provide connectivity towards the centrally located nodes for location services.

NEF Use-Case

Figure 16:
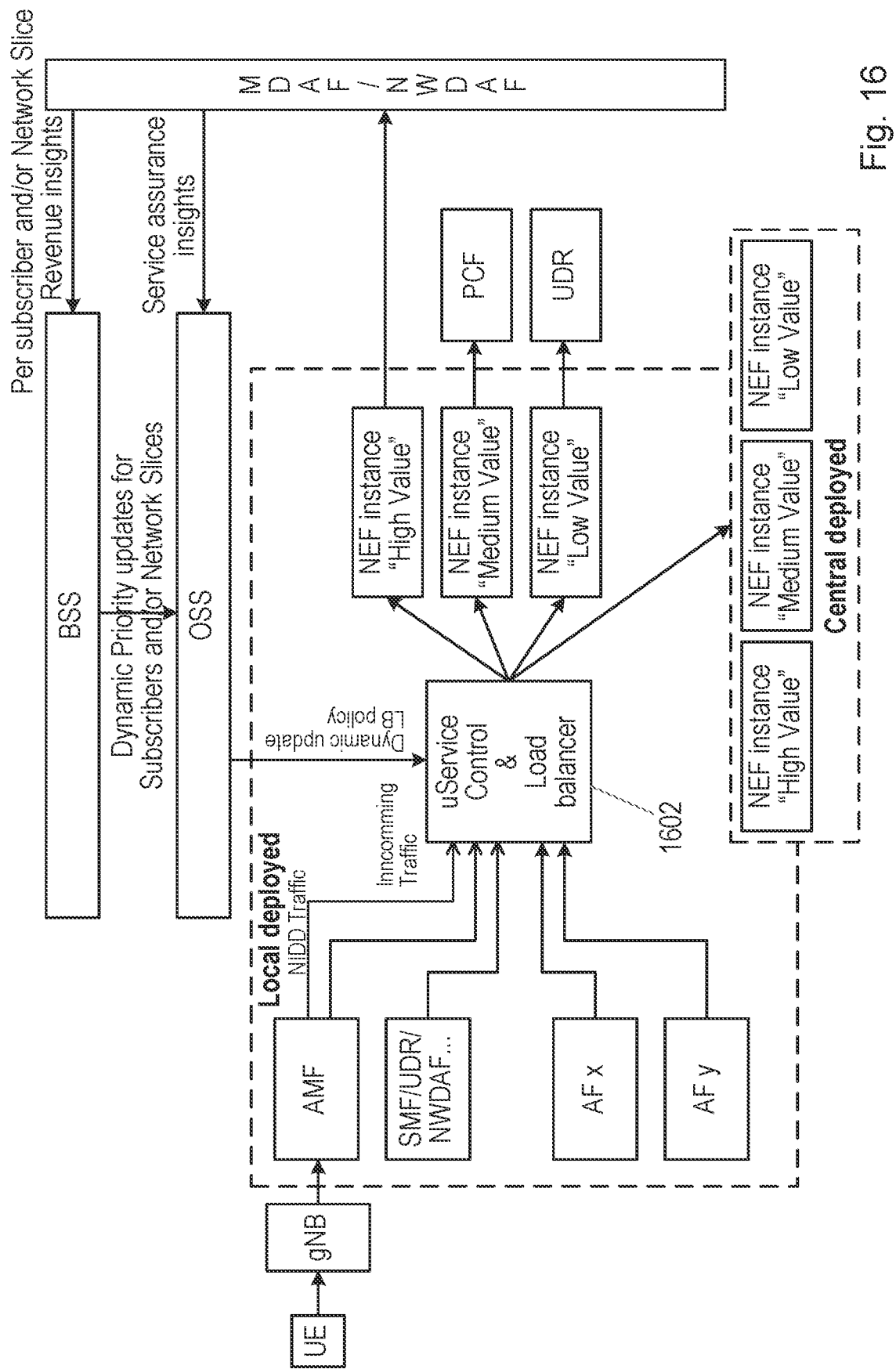
FIG. 16 illustrates a use case according to which load balancing is performed between central and distributed NEFs.

FIG. 16 illustrates a use case according to which load balancing is performed between central and distributed NEFs. In the illustrated deployment, an external Load Balancer 1602 handles priority between different traffic sources based on MDAF/NWDAF recommendations for service assurance for network slices, revenue based recommendations at a network slice level (i.e. directly related to BSS service level agreements for a network slice) and revenue based recommendations at a subscriber/UE level for subscribers/UEs connected to the same network slice (i.e. the same BSS service).

All ingress traffic to a Micro Service cluster, for example implementing a NEF, will enter the load balancer 1602. In the illustrated deployment the ingress traffic may originate from a UE as NIDD traffic (user plane traffic carried in the control plane), from node internal functions such as AMF, SMF, MDAF/NWDAF delivering service triggers that the NEF has subscribed to, or NFs may make requests for data transmission to AFs. In addition, an AF may request triggers for network and UE events and also send rules to the network (including for example traffic detection rules and policies for application traffic routing). Implementation of the NEF function in a micro service cluster may be performed for a distributed deployment, and in such cases the load balancer will route traffic according to polices to local and/or central instance of a micro service that implements the NEF instance.

As discussed above, a network architecture as illustrated in FIG. 16 may be foreseen for 5G Core networks, as the NEF will be providing an interface towards 3GPP Applications and also to internal interfaces with 5G Core. A Load Balancer function may be included and used in real life deployments. This Load Balancer can be used to dynamically manage the traffic towards the NEF nodes.

In a further example, load balancers may be deployed across VMs/uService Instance. An example VNF level implementation is illustrated in FIG. 17.

Figure 17:
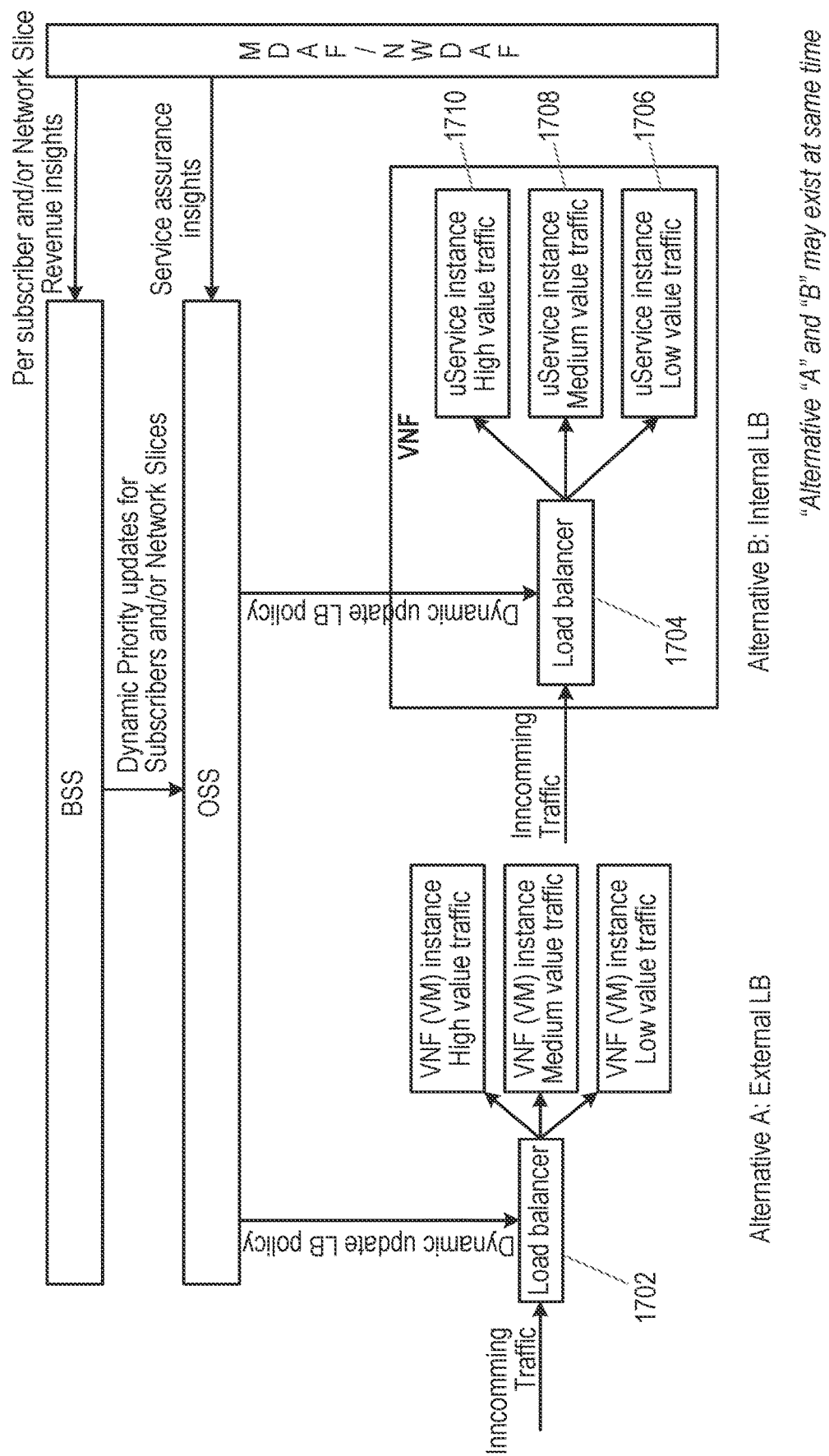
FIG. 17 illustrates a use case according to which load balancing is performed at VNF level.

Referring to FIG. 17, in a micro service architecture, a Load Balancer may be implemented in an "ingress proxy". Control of the proxy is performed from a control plane function such as Kubernetes control plane "Master", or Istio Control Plane "Pilot". For simplification of FIG. 17, the proxy and the control plane are visualized as one entity "Load balancer" (however in reality they may be implemented as separate entities). In a uService architecture there may be an external LB and an internal LB, and FIG. 17 illustrates the alternatives. Both external and internal LBs can be used at the same time. In this manner, traffic enters first the external LB 1702, and the external LB selects the NF to be used for the incoming traffic source. When the traffic enters the selected NF, an internal LB 1704 selects which uService instance to use. Different priority traffic may be assigned to different instances 1706, 1708, 1710, (for example as in Kubernetes Pod) with priority being determined according to recommendations from a NWDAF/MDAF, OSS and/or BSS.

In another alternative implementation, traffic queue scheduling may be used to prioritize traffic according to recommendations provided as discussed above, using ques with different priorities.

As discussed above, the methods 200 to 800 are performed by a Data Analytics Function, Network Function, Load Balancer and Support System respectively. The present disclosure provides a Data Analytics Function, Network Function, Load Balancer and Support System which are adapted to perform any or all of the steps of the above discussed methods.

Figure 18:
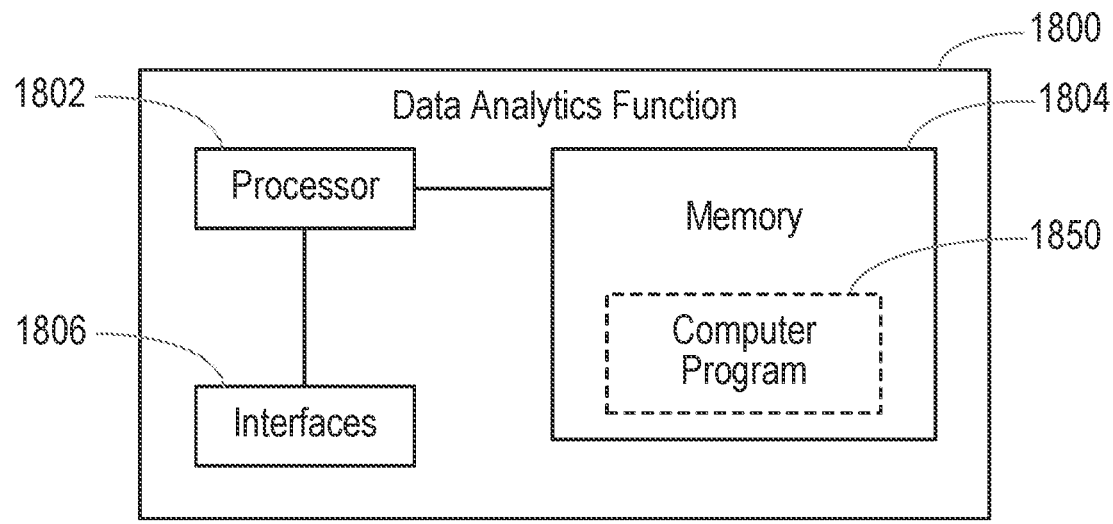
FIG. 18 is a block diagram illustrating functional units in a Data Analytics Function.

FIG. 18 is a block diagram illustrating an example Data Analytics Function (DAF) 1800 which may implement the method 200 and/or 300 according to examples of the present disclosure, for example on receipt of suitable instructions from a computer program 1850. Referring to FIG. 18, the DAF 1800 comprises a processor or processing circuitry 1802, and may comprise a memory 1804 and interfaces 1806. The processing circuitry 1802 is operable to perform some or all of the steps of the method 200 and/or 300 as discussed above with reference to FIGS. 2 and 3. The memory 1804 may contain instructions executable by the processing circuitry 1802 such that the DAF 1800 is operable to perform some or all of the steps of the method 200 and/or 300. The instructions may also include instructions for executing one or more telecommunications and/or data communications protocols. The instructions may be stored in the form of the computer program 1850. In some examples, the processor or processing circuitry 1802 may include one or more microprocessors or microcontrollers, as well as other digital hardware, which may include digital signal processors (DSPs), special-purpose digital logic, etc. The processor or processing circuitry 1802 may be implemented by any type of integrated circuit, such as an Application Specific Integrated Circuit (ASIC), Field Programmable Gate Array (FPGA) etc. The memory 1804 may include one or several types of memory suitable for the processor, such as read-only memory (ROM), random-access memory, cache memory, flash memory devices, optical storage devices, solid state disk, hard disk drive etc.

Figure 19:
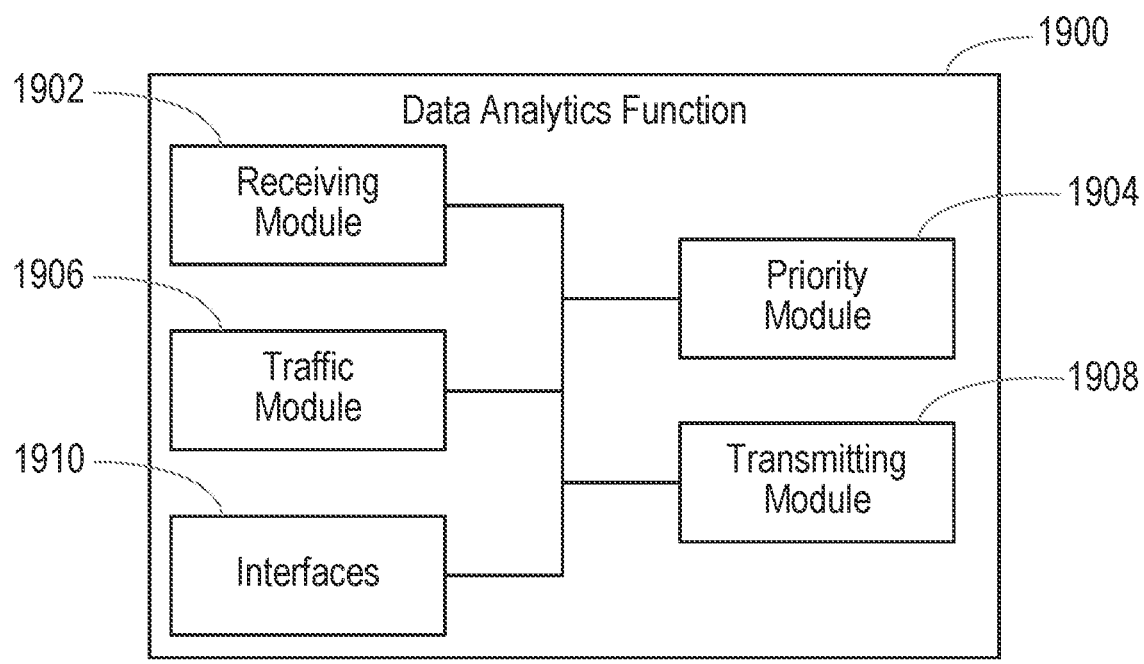
FIG. 19 is a block diagram illustrating functional units in another example of Data Analytics Function.

FIG. 19 illustrates functional units in another example of DAF 1900 which may execute examples of the methods 200 and/or 300 of the present disclosure, for example according to computer readable instructions received from a computer program. It will be understood that the units illustrated in FIG. 19 are functional units, and may be realised in any appropriate combination of hardware and/or software. The units may comprise one or more processors and may be integrated to any degree.

Referring to FIG. 19, the DAF 1900 comprises a receiving module 1902 for receiving information about traffic flows over the communication channel, a priority module 1904 for establishing a priority amongst traffic flows over the communication channel, based on the received information, a traffic module 1906 for generating a recommendation for traffic processing on the basis of the established priority, and a transmitting module 1908 for sending the generated recommendation to a function in the network that has a management responsibility for the target network function. The DAF may also comprise interfaces 1910.

Figure 20:
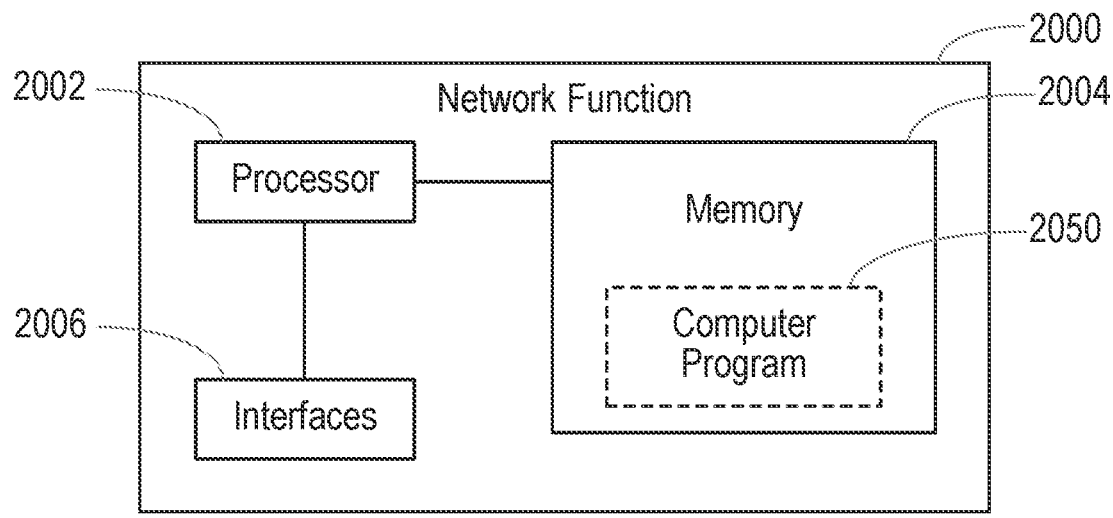
FIG. 20 is a block diagram illustrating functional units in a target Network Function.

FIG. 20 is a block diagram illustrating an example Network Function (NF) 2000 which may implement the method 400 and/or 500 according to examples of the present disclosure, for example on receipt of suitable instructions from a computer program 2050. Referring to FIG. 20, the NF 2000 comprises a processor or processing circuitry 2002, and may comprise a memory 2004 and interfaces 2006. The processing circuitry 2002 is operable to perform some or all of the steps of the method 400 and/or 500 as discussed above with reference to FIGS. 4 and 5. The memory 2004 may contain instructions executable by the processing circuitry 2002 such that the NF 2000 is operable to perform some or all of the steps of the method 400 and/or 500. The instructions may also include instructions for executing one or more telecommunications and/or data communications protocols. The instructions may be stored in the form of the computer program 2050. In some examples, the processor or processing circuitry 2002 may include one or more microprocessors or microcontrollers, as well as other digital hardware, which may include digital signal processors (DSPs), special-purpose digital logic, etc. The processor or processing circuitry 2002 may be implemented by any type of integrated circuit, such as an Application Specific Integrated Circuit (ASIC), Field Programmable Gate Array (FPGA) etc. The memory 2004 may include one or several types of memory suitable for the processor, such as read-only memory (ROM), random-access memory, cache memory, flash memory devices, optical storage devices, solid state disk, hard disk drive etc.

Figure 21:
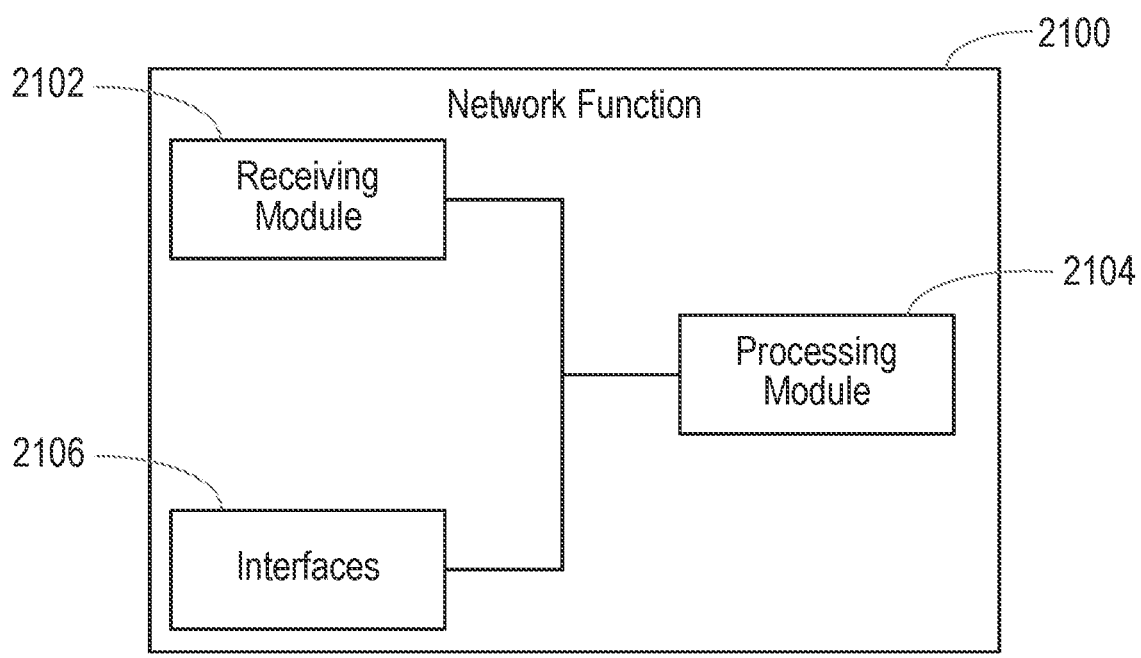
FIG. 21 is a block diagram illustrating functional units in another example of target Network Function.

FIG. 21 illustrates functional units in another example of NF 2100 which may execute examples of the methods 400 and/or 500 of the present disclosure, for example according to computer readable instructions received from a computer program. It will be understood that the units illustrated in FIG. 21 are functional units, and may be realised in any appropriate combination of hardware and/or software. The units may comprise one or more processors and may be integrated to any degree.

Referring to FIG. 21, the NF 2100 comprises a receiving module 2102 for receiving a recommendation from another function in the network, and a processing module 2104 for processing traffic received at the network function over the communication channel in accordance with the received recommendation, wherein the recommendation determines a priority with which different traffic flows are to be processed in the network function. The NF 2100 may further comprise interfaces 2106.

Figure 22:
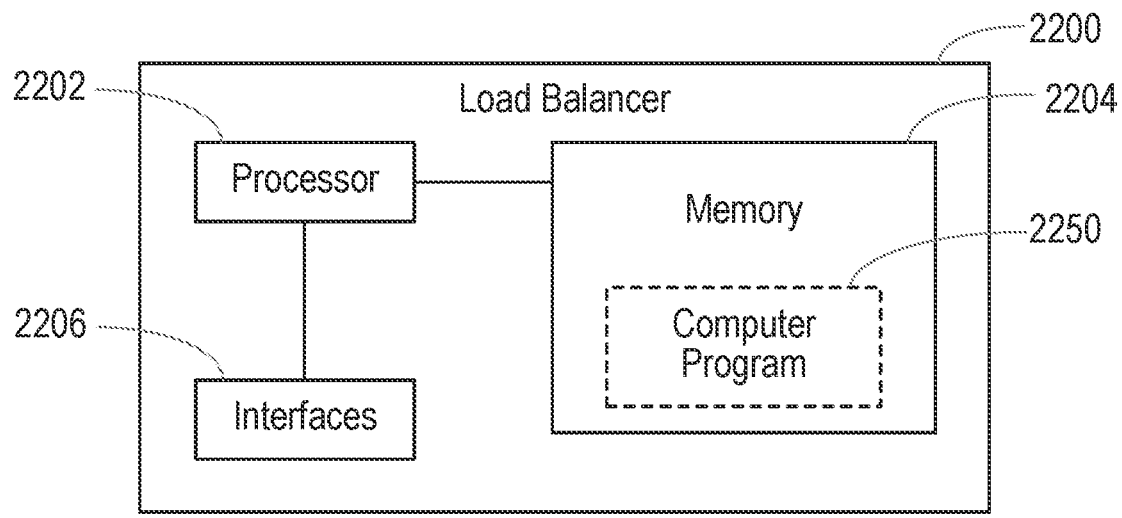
FIG. 22 is a block diagram illustrating functional units in a Load Balancer.

FIG. 22 is a block diagram illustrating an example Load Balancer (LB) 2200 which may implement the method 600 according to examples of the present disclosure, for example on receipt of suitable instructions from a computer program 2250. Referring to FIG. 22, the LB 2200 comprises a processor or processing circuitry 2202, and may comprise a memory 2204 and interfaces 2206. The processing circuitry 2202 is operable to perform some or all of the steps of the method 600 as discussed above with reference to FIG. 6. The memory 2204 may contain instructions executable by the processing circuitry 2202 such that the LB 2200 is operable to perform some or all of the steps of the method 600. The instructions may also include instructions for executing one or more telecommunications and/or data communications protocols. The instructions may be stored in the form of the computer program 2250. In some examples, the processor or processing circuitry 2202 may include one or more microprocessors or microcontrollers, as well as other digital hardware, which may include digital signal processors (DSPs), special-purpose digital logic, etc. The processor or processing circuitry 2202 may be implemented by any type of integrated circuit, such as an Application Specific Integrated Circuit (ASIC), Field Programmable Gate Array (FPGA) etc. The memory 2204 may include one or several types of memory suitable for the processor, such as read-only memory (ROM), random-access memory, cache memory, flash memory devices, optical storage devices, solid state disk, hard disk drive etc.

Figure 23:
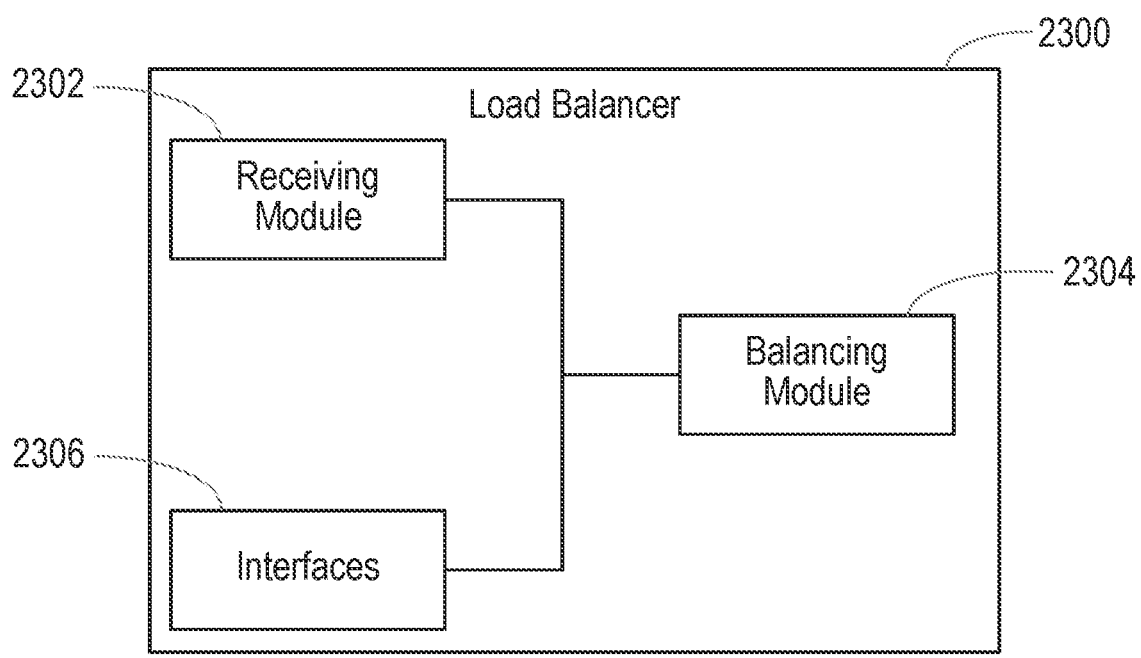
FIG. 23 is a block diagram illustrating functional units in another example of Load Balancer.

FIG. 23 illustrates functional units in another example of LB 2300 which may execute examples of the method 600 of the present disclosure, for example according to computer readable instructions received from a computer program. It will be understood that the units illustrated in FIG. 23 are functional units, and may be realised in any appropriate combination of hardware and/or software. The units may comprise one or more processors and may be integrated to any degree.

Referring to FIG. 23, the LB 2300 comprises a receiving module 2302 for receiving a recommendation from another function in the network, and a balancing module 2304 for distributing traffic received at the LB between instances of the target network function in accordance with the received recommendation, wherein the recommendation determines a priority with which different traffic flows are to be processed by instances of the target network function. The LB 2300 may further comprise interfaces 2306.

Figure 24:
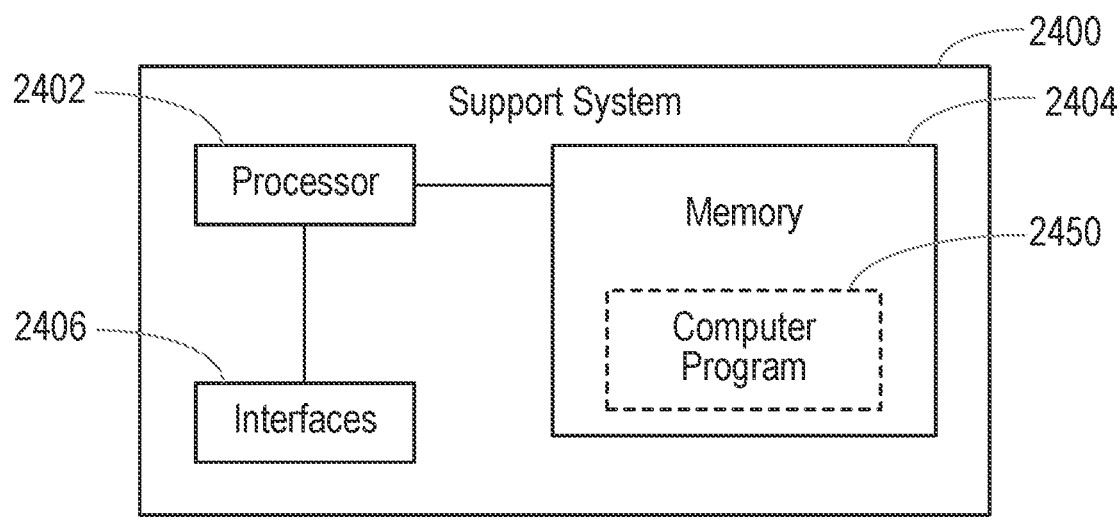
FIG. 24 is a block diagram illustrating functional units in a Support System.

FIG. 24 is a block diagram illustrating an example Support System (SS) 2400 which may implement the method 700 and/or 800 according to examples of the present disclosure, for example on receipt of suitable instructions from a computer program 2450. Referring to FIG. 24, the SS 2400 comprises a processor or processing circuitry 2402, and may comprise a memory 2404 and interfaces 2406. The processing circuitry 2402 is operable to perform some or all of the steps of the method 700 and/or 800 as discussed above with reference to FIGS. 7 and 8. The memory 2404 may contain instructions executable by the processing circuitry 2402 such that the SS 2400 is operable to perform some or all of the steps of the method 700 and/or 800. The instructions may also include instructions for executing one or more telecommunications and/or data communications protocols. The instructions may be stored in the form of the computer program 2450. In some examples, the processor or processing circuitry 2402 may include one or more microprocessors or microcontrollers, as well as other digital hardware, which may include digital signal processors (DSPs), special-purpose digital logic, etc. The processor or processing circuitry 2402 may be implemented by any type of integrated circuit, such as an Application Specific Integrated Circuit (ASIC), Field Programmable Gate Array (FPGA) etc. The memory 2404 may include one or several types of memory suitable for the processor, such as read-only memory (ROM), random-access memory, cache memory, flash memory devices, optical storage devices, solid state disk, hard disk drive etc.

Figure 25:
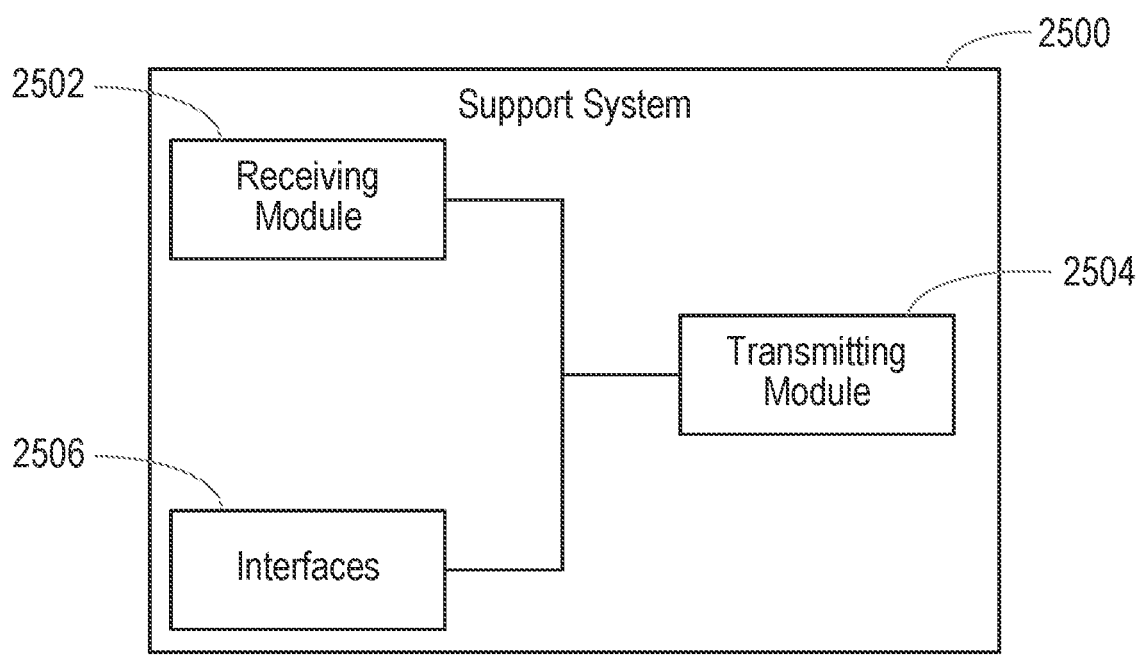
FIG. 25 is a block diagram illustrating functional units in another example of Support System.

FIG. 25 illustrates functional units in another example of SS 2500 which may execute examples of the methods 700 and/or 800 of the present disclosure, for example according to computer readable instructions received from a computer program. It will be understood that the units illustrated in FIG. 25 are functional units, and may be realised in any appropriate combination of hardware and/or software. The units may comprise one or more processors and may be integrated to any degree.

Referring to FIG. 25, the SS 2500 comprises a receiving module 2502 for receiving a recommendation from a Data Analytics Function in the network, and a transmitting module 2504 for sending a policy control rule based on the received recommendation to at least one of the target function in the network and/or a Load Balancer, LB, in the network, wherein the recommendation determines a priority with which different traffic flows are to be processed by instances of the target network function. The SS 2500 may further comprise interfaces 2506.

Aspects and examples of the present disclosure thus provide methods enabling the prioritization of traffic over a communication channel that carries traffic between network functions and application functions. The prioritization may be performed on the basis of information covering a range of parameters including criticality of the traffic, revenue insights in general, revenue insights across network slices for different business streams, among Network user plane traffic etc. The information may be obtained from different network and/or non network nodes including Application Functions, OSS, BSS and other NFs. The prioritization may be performed with reference to traffic at a target network function, which may be a NEF, and may be performed during periods of congestion. It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing traffic processed by a target network function of a communication network, wherein the target network function transmits and receives traffic over a communication channel that carries traffic between network functions and application functions, the method, performed by a Data Analytics Function, DAF, of a communication network, comprising:
   receiving information about traffic flows over the communication channel;
   establishing a priority amongst traffic flows over the communication channel, based on the received information, wherein establishing the priority amongst traffic flows comprises applying a Machine Learning, ML, model to the received information, the ML model trained to prioritize traffic flows according to a defined objective;
   generating a recommendation for processing of the traffic flows on the basis of the established priority, wherein the recommendation comprises a policy control rule to implement the established priority; and
   sending the generated recommendation to a function in the network that has a management responsibility for the target network function.

2. A method as claimed in claim 1, wherein the communication channel comprises a control plane communication channel that carries control plane messages between network functions.

3. A method as claimed in claim 1, wherein the communication channel comprises a control plane channel that carries user plane data packets related to end user applications.

4. A method as claimed in claim 1, wherein establishing priority amongst traffic flows carried over the communication channel, based on the received information, comprises establishing a priority amongst traffic flows carried over the communication channel for the target network function or for a Network Slice, NS, in which the target network function is configured to transmit and receive traffic.

5. A method as claimed in claim 1, further comprising:
   generating a resource requirement for the target network function based on the received information about traffic flows carried over the communication channel;
   sending the generated resource requirement to a Network Functions Virtualisation Orchestration, NFVO, function.

6. A method for managing traffic processed by a target network function of a communication network, wherein the target network function transmits and receives traffic over a communication channel that carries traffic between network functions and application functions, the method, performed by a Data Analytics Function, DAF, of a communication network, comprising:
   receiving information about traffic flows over the communication channel;
   generating a predicted risk of congestion in the network on the basis of the received information about traffic flows carried over the communication channel;
   establishing a priority amongst traffic flows over the communication channel, based on the received information;
   generating a recommendation for processing of the traffic flows on the basis of the established priority, wherein the recommendation comprises a policy control rule to implement the established priority; and
   sending the generated recommendation to a function in the network that has a management responsibility for the target network function.

7. A method as claimed in claim 6, wherein generating a predicted risk of congestion in the network on the basis of the received information about traffic flows in the network comprises applying a Machine Learning, ML, model to the received information about traffic flows in the network.

8. A method for managing traffic processed by a target Network Function, NF, of a communication network, wherein the target NF transmits and receives traffic over a communication channel that carries traffic between network functions and application functions, the method, performed by the target NF comprising:
   receiving a recommendation from another function in the network, wherein the recommendation determines a priority with which different traffic flows are to be processed in the network function, wherein the recommendation comprises a policy control rule;
   processing traffic flows received at the network function over the communication channel in accordance with the received recommendation;
   determining that a measure of congestion in the function fulfils a condition; and
   responsive to determining that the measure of congestion in the function fulfils the condition, requesting the policy control rule for prioritizing handling of traffic from another function in the network.

9. A method as claimed in claim 8, wherein the communication channel comprises a control plane communication channel that carries control plane messages between network functions.

10. A method as claimed in claim 8, wherein the communication channel comprises a control plane channel that carries user plane data packets related to end user applications.

11. A method as claimed in claim 8, wherein the recommendation is generated by a DAF.

12. A method as claimed in claim 8, wherein the target network function comprises a Network Exposure Function, NEF, the method further comprising:
- receiving a load status report from an Application Function; and
- sending the received load status report to a DAF in the network.

13. A Data Analytics Function, DAF, for a communication network, the DAF being for managing traffic processed by a target network function of a communication network, wherein the target network function transmits and receives traffic over a communication channel that carries traffic between network functions and application functions, the DAF comprising processing circuitry and a memory, the memory containing instructions executable by the processing circuitry such that the DAF is operative to:
- receive information about traffic flows over the communication channel;
- establish a priority amongst traffic flows over the communication channel, based on the received information, wherein establishing the priority amongst traffic flows comprises applying a Machine Learning, ML, model to the received information, the ML model trained to prioritize traffic flows according to a defined objective;
- generate a recommendation for processing of the traffic flows on the basis of the established priority, wherein the recommendation comprises a policy control rule to implement the established priority; and
- send the generated recommendation to a function in the network that has a management responsibility for the target network function.

14. A DAF as claimed in claim 13, wherein the processing circuitry is further configured to generate a predicted risk of congestion in the network on the basis of the received information about traffic flows carried over the communication channel.

15. A target Network Function, NF, for a communications network, the target NF being for managing traffic processed by the target NF, wherein the target NF transmits and receives traffic over a communication channel that carries traffic between network functions and application functions, the target NF comprising processing circuitry and a memory, the memory containing instructions executable by the processing circuitry such that the NF is operative to:
- receive a recommendation from another function in the network, wherein the recommendation determines a priority with which different traffic flows are to be processed in the network function, wherein the recommendation comprises a policy control rule;
- process traffic flows received at the network function over the communication channel in accordance with the received recommendation;
- determine that a measure of congestion in the function fulfils a condition; and
- responsive to determining that the measure of congestion in the function fulfils the condition, request the policy control rule for prioritizing handling of traffic from another function in the network.

* * * * *